US009881314B2

(12) United States Patent
Eaton et al.

(10) Patent No.: US 9,881,314 B2
(45) Date of Patent: Jan. 30, 2018

(54) CALCULATION OF A THIRD PARTY SOLICITATION FEE

(71) Applicant: NOKIA TECHNOLOGIES OY, Espoo (FI)

(72) Inventors: Brook Eaton, Los Altos, CA (US); Richard Collin, East Sussex (GB)

(73) Assignee: Nokia Technologies Oy, Espoo (FI)

( * ) Notice: Subject to any disclaimer, the term of this patent is extended or adjusted under 35 U.S.C. 154(b) by 297 days.

(21) Appl. No.: 14/633,071

(22) Filed: Feb. 26, 2015

(65) Prior Publication Data

US 2016/0253692 A1 Sep. 1, 2016

(51) Int. Cl.
*G06Q 30/00* (2012.01)
*G06Q 30/02* (2012.01)
*G06Q 90/00* (2006.01)

(52) U.S. Cl.
CPC ......... *G06Q 30/0214* (2013.01); *G06Q 90/00* (2013.01)

(58) Field of Classification Search
CPC .................................................. G06C 30/0273
USPC ......................................................... 705/14
See application file for complete search history.

(56) References Cited

U.S. PATENT DOCUMENTS

| | | | |
|---|---|---|---|
| 9,510,038 B2* | 11/2016 | Gildfind | H04N 21/44218 |
| 2002/0077897 A1 | 6/2002 | Zellner et al. | |
| 2002/0099600 A1* | 7/2002 | Merriman | G06Q 30/02 705/14.52 |
| 2003/0018976 A1 | 1/2003 | Wasilewski | |
| 2003/0216930 A1* | 11/2003 | Dunham | G06Q 30/02 705/26.1 |
| 2003/0220074 A1 | 11/2003 | Wee et al. | |
| 2007/0162456 A1 | 7/2007 | Agassi et al. | |
| 2008/0255921 A1* | 10/2008 | Flake | G06Q 30/02 705/14.71 |
| 2009/0043648 A1* | 2/2009 | Mandian | G06Q 30/02 705/14.39 |
| 2010/0036726 A1* | 2/2010 | Gallet | G06Q 30/02 705/14.43 |
| 2010/0274645 A1 | 10/2010 | Trevithick et al. | |
| 2011/0066503 A1 | 3/2011 | Kanapur et al. | |

(Continued)

FOREIGN PATENT DOCUMENTS

| | | |
|---|---|---|
| EP | 2 772 881 A1 | 9/2014 |
| WO | WO 01/45011 A1 | 6/2001 |

OTHER PUBLICATIONS

Novak et al., *A Survey of Security and Privacy in Online Social Networks*, College of William & Mary Department of Computer Science ( Apr. 20, 2012) 1-32.

(Continued)

*Primary Examiner* — Matthew L Hamilton
(74) *Attorney, Agent, or Firm* — Alston & Bird LLP

(57) ABSTRACT

A method comprising calculating a third party solicitation fee for a third party, receiving, from a third party server, a third party solicitation on behalf of the third party, sending the third party solicitation to a user apparatus in response to the receipt of the third party solicitation, the third party solicitation comprising a request for a specified action, receiving information indicative of the user apparatus performing the specified action, and decreasing the third party solicitation fee based, at least in part, on the receipt of the information indicative of the user apparatus performing the specified action is disclosed.

20 Claims, 15 Drawing Sheets

(56) References Cited

U.S. PATENT DOCUMENTS

| | | | |
|---|---|---|---|
| 2011/0071893 A1 | 3/2011 | Malhotra et al. | |
| 2012/0023570 A1 | 1/2012 | Gorodyansky | |
| 2012/0130810 A1* | 5/2012 | Kilgore | G06Q 30/0251 |
| | | | 705/14.53 |
| 2013/0060601 A1 | 3/2013 | Kodialam et al. | |
| 2013/0246167 A1* | 9/2013 | Qin | G06Q 30/0256 |
| | | | 705/14.46 |
| 2013/0311925 A1 | 11/2013 | Denker et al. | |
| 2013/0312018 A1* | 11/2013 | Elliott | H04N 21/45 |
| | | | 725/12 |
| 2014/0214523 A1* | 7/2014 | Rosenberg | G06Q 30/00 |
| | | | 705/14.39 |
| 2015/0088623 A1* | 3/2015 | Goel | G06Q 30/0277 |
| | | | 705/14.6 |

OTHER PUBLICATIONS

U.S. Appl. No. 14/633,063, filed Feb. 26, 2015, In re: Eaton et al. entitled *Determination of a User Context and Sending of a Third Party Proposition*.

Z Launder [online] [retrieved Sep. 24, 2015], Retrieved from the internet: <URL: http://www.zlauncher.com/>. (2015) 6 pages.

Hoecke et al., "Design and Implementation of a Secure Media Content Delivery Broker Architecture", Jan. 2005, pp. 8 pages.

Office Action from U.S. Appl. No. 14/633,063 dated Jun. 26, 2017, 17 pages.

Office Action for U.S. Appl. No. 14/633,063, dated Nov. 17, 2017, 18 pages.

* cited by examiner

FIG. 7A

| User context 700 | Circumstantial information 701 | Circumstantial information 702 | Circumstantial information 703 | Circumstantial information 704 |
|---|---|---|---|---|
| User context 710 | Circumstantial information 711 | Circumstantial information 712 | Circumstantial information 713 | |

| User account 720 | Third party user account 721 | Third party user account 722 | Third party user account 723 | |
|---|---|---|---|---|
| User account 730 | Third party user account 731 | Third party user account 732 | | |
| User account 740 | Third party user account 741 | Third party user account 742 | Third party user account 743 | Third party user account 744 |

| Third party user account 750 | User context classification 751 | User context classification 752 | |
|---|---|---|---|
| Third party user account 760 | User context classification 761 | User context classification 762 | User context classification 763 |
| Third party user account 770 | User context classification 771 | | |

755

| Third party 810 | Third party solicitation fee 811 |
| Third party 820 | Third party solicitation fee 821 |
| Third party 830 | Third party solicitation fee 831 |

FIG. 8A

| Third party 850 | Total solicitations 851 | Performed solicitations 852 | Third party solicitation fee 853 |
| Third party 860 | Total solicitations 861 | Performed solicitations 862 | Third party solicitation fee 863 |
| Third party 870 | Total solicitations 871 | Performed solicitations 872 | Third party solicitation fee 873 |

FIG. 8B

CALCULATION OF A THIRD PARTY SOLICITATION FEE

TECHNICAL FIELD

The present application relates generally to calculation of a third party solicitation fee.

BACKGROUND

As electronic apparatuses become increasingly pervasive in our society, it has become increasingly important to provide users with a user experience that is beneficial to the user and complementary to the user's activities. For example, a user may desire to utilize a user apparatus in conjunction with a variety of daily activities, actions, and/or the like. As such, it may be desirable to provide a user of the user apparatus with an easy and intuitive manner in which to access and utilize various applications and/or services that may be attainable by way of the user apparatus.

SUMMARY

Various aspects of example embodiments are set out in the summary, the drawings, the detailed description, and the claims.

One or more example embodiments may provide an apparatus, a computer readable medium, a non-transitory computer readable medium, a computer program product, and/or a method for identifying a user account associated with a user, the user account referencing at least one third party user account associated with the user, receiving, by an apparatus from a separate apparatus, circumstantial information that is indicative of a user context of the user, determining the user context based, at least in part, on the circumstantial information, determining that the user context is classified by at least one user context classification that is associated with the third party user account, sending, in response to the determination that the user context is classified by the user context classification that is associated with the third party user account, information indicative of the third party user account and the user context to a third party server, the third party server being associated with the third party user account, receiving a third party proposition from the third party server in response to the sending of information indicative of the third party user account and the user context, and sending, to a user apparatus, the third party proposition in response to the receipt of the third party proposition, the user apparatus being operated by the user.

One or more example embodiments may provide an apparatus, a computer readable medium, a computer program product, and/or a non-transitory computer readable medium having means for identifying a user account associated with a user, the user account referencing at least one third party user account associated with the user, means for receiving, by an apparatus from a separate apparatus, circumstantial information that is indicative of a user context of the user, means for determining the user context based, at least in part, on the circumstantial information, means for determining that the user context is classified by at least one user context classification that is associated with the third party user account, means for sending, in response to the determination that the user context is classified by the user context classification that is associated with the third party user account, information indicative of the third party user account and the user context to a third party server, the third party server being associated with the third party user account, means for receiving a third party proposition from the third party server in response to the sending of information indicative of the third party user account and the user context, and means for sending, to a user apparatus, the third party proposition in response to the receipt of the third party proposition, the user apparatus being operated by the user.

In at least one example embodiment, the third party proposition is associated with the user context.

In at least one example embodiment, the third party proposition correlates with the user context.

In at least one example embodiment, the separate apparatus is the user apparatus.

One or more example embodiments further perform preclusion of sending, to the third party server, of information indicative of at least one different third party user account that is associated with the user account.

One or more example embodiments further perform preclusion of sending, to the third party server, of information indicative of any different third party user account that is associated with the user account.

In at least one example embodiment, the determination of the user context is based, at least in part, on the circumstantial information in relation to historical user context information.

In at least one example embodiment, the historical user context information comprises user context information associated with the user.

In at least one example embodiment, the historical user context information comprises user context information associated with at least another user.

In at least one example embodiment, the third party proposition comprises a third party advertisement.

In at least one example embodiment, the third party proposition comprises a third party solicitation.

In at least one example embodiment, the third party solicitation is a solicitation that is intended to solicit action from the user.

In at least one example embodiment, the third party solicitation is a solicitation that is intended to solicit a user to cause invocation, by way of the user apparatus, of at least one operation.

In at least one example embodiment, the third party proposition comprises a third party notification.

In at least one example embodiment, the user account is associated with the user apparatus, and the identification of the user account associated with the user is based, at least in part, on the user apparatus.

One or more example embodiments further perform identification of the user apparatus, wherein the identification of the user account associated with the user is based, at least in part, on the identification of the user apparatus.

In at least one example embodiment, the user account is associated with a user identity, and the identification of the user account associated with the user is based, at least in part, on the user identity.

One or more example embodiments further perform identification of the user identity, wherein the identification of the user account associated with the user is based, at least in part, on the identification of the user identity.

In at least one example embodiment, the user account references another third party user account associated with the user.

One or more example embodiments further perform determination that the at least one user context classification fails to be associated with the other third party user account.

One or more example embodiments further perform preclusion of sending, in response to the determination that the at least one user context classification fails to be associated with the other third party user account, of information indicative of the other third party user account and the user context to another third party server, the other third party server being associated with the other third party user account.

One or more example embodiments further perform preclusion of sending, to the third party server, of information indicative of the other third party user account that is associated with the user account.

One or more example embodiments further perform determination that the user context is classified by at least one user context classification that is associated with the other third party user account, and sending, in response to the determination that the user context is classified by the user context classification that is associated with the other third party user account, of information indicative of the other third party user account and the user context to another third party server, the other third party server being associated with the other third party user account.

One or more example embodiments further perform receipt of another third party proposition from the other third party server in response to the sending of information indicative of the other third party user account and the user context to the other third party server, and sending, to the user apparatus, of the other third party proposition in response to the receipt of the other third party proposition.

In at least one example embodiment, the user context comprises information indicative of a user activity of the user.

In at least one example embodiment, the user context comprises information indicative of a user apparatus operation of the user apparatus.

In at least one example embodiment, the user context comprises information indicative of a separate apparatus operation of the separate apparatus.

In at least one example embodiment, the user context comprises information indicative of an application event associated with an application of the user apparatus.

In at least one example embodiment, the application event is indicative of an application interaction of the user with the application.

In at least one example embodiment, the user context comprises information indicative of an application event associated with an application of the separate apparatus.

In at least one example embodiment, the application event is indicative of an application interaction of the user with the application.

In at least one example embodiment, the user context comprises information indicative of at least one environmental condition.

In at least one example embodiment, the environmental condition is indicative of at least one environmental characteristic of an environment surrounding the user.

In at least one example embodiment, the environmental condition comprises information indicative of at least one of a lighting level, a temperature, a time, a location, or a weather condition.

In at least one example embodiment, the third party user account is associated with a third party.

In at least one example embodiment, the circumstantial information is information from which the user context may be inferred.

In at least one example embodiment, the circumstantial information comprises at least one of sensor information, a time, a location, a weather condition, a temperature, a lighting level, an application interaction, an apparatus interaction with the user apparatus, or an apparatus interaction with the separate apparatus.

In at least one example embodiment, the user context is a past user context.

In at least one example embodiment, the past user context is indicative of a user context of the user at a time prior to a time associated with a present user context.

In at least one example embodiment, the user context is a present user context.

In at least one example embodiment, the present user context is indicative of a user context of the user at a current time.

In at least one example embodiment, the user context is a predicted user context.

In at least one example embodiment, the predicted user context is indicative of a user context of the user at a time subsequent to a time associated with a present user context.

In at least one example embodiment, the determination of the predicted user context is based, at least in part, on the circumstantial information in relation to historical user context information.

One or more example embodiments further perform determination that the circumstantial information in relation to the historical user context information indicates a probability that the predicted user context is applicable to the user such that the probability exceeds a threshold probability.

One or more example embodiments further perform determination of a different user context based, at least in part, on the circumstantial information, determination that the different user context is classified by at least one user context classification that is associated with the third party user account, sending, in response to the determination that the different user context is classified by the user context classification that is associated with the third party user account, of information indicative of the third party user account and the different user context to the third party server, determination that the third party server failed to send any third party proposition in response to the sending of information indicative of the third party user account and the different user context, and preclusion of sending, to the user apparatus, of any third party proposition from the third party server that correlates with the different user context in response to the determination that the third party server failed to send any third party proposition.

One or more example embodiments may provide an apparatus, a computer readable medium, a non-transitory computer readable medium, a computer program product, and/or a method for calculating a third party solicitation fee for a third party, receiving, from a third party server, a third party solicitation on behalf of the third party, sending the third party solicitation to a user apparatus in response to the receipt of the third party solicitation, the third party solicitation comprising a request for a specified action, receiving information indicative of the user apparatus performing the specified action, and decreasing the third party solicitation fee based, at least in part, on the receipt of the information indicative of the user apparatus performing the specified action.

One or more example embodiments may provide an apparatus, a computer readable medium, a computer program product, and/or a non-transitory computer readable medium having means for calculating a third party solicitation fee for a third party, means for receiving, from a third party server, a third party solicitation on behalf of the third party, means for sending the third party solicitation to a user apparatus in response to the receipt of the third party solicitation, the third party solicitation comprising a request for a specified action, means for receiving information indicative of the user apparatus performing the specified action, and means for decreasing the third party solicitation fee based, at least in part, on the receipt of the information indicative of the user apparatus performing the specified action.

One or more example embodiments further perform calculation of another third party solicitation fee for another third party, receipt of, from another third party server, another third party solicitation on behalf of the other third party, and sending of the other third party solicitation to the user apparatus in response to the receipt of the other third party solicitation, the other third party solicitation comprising a request for another specified action.

One or more example embodiments further perform receipt of information indicative of the user apparatus performing the other specified action, and decreasing of the other third party solicitation fee based, at least in part, on the receipt of the information indicative of the user apparatus performing the other specified action.

In at least one example embodiment, the third party solicitation specifies the specified action.

In at least one example embodiment, the third party solicitation comprises information that is configured to communicate the specified action to a user of the user apparatus.

In at least one example embodiment, the information indicative of the user apparatus performing the specified action is received from the user apparatus.

In at least one example embodiment, the information indicative of the user apparatus performing the specified action is received from the third party server.

In at least one example embodiment, the information indicative of the user apparatus performing the specified action comprises information that indicates that a user of the user apparatus invoked the specified action.

One or more example embodiments further perform sending of information indicative of the third party solicitation fee to the third party server.

In at least one example embodiment, the sending of information indicative of the third party solicitation fee to the third party server is performed in response to the calculation of the third party solicitation fee.

In at least one example embodiment, the sending of information indicative of the third party solicitation fee to the third party server is performed in response to the decreasing of the third party solicitation fee.

One or more example embodiments further perform sending of information indicative of the user apparatus performing the specified action to the third party server.

One or more example embodiments further perform receipt of, from the third party server, another third party solicitation on behalf of the third party, sending of the other third party solicitation to the user apparatus in response to the receipt of the other third party solicitation, the other third party solicitation comprising a request for another specified action, and determination that the user apparatus failed to perform the specified action.

One or more example embodiments further perform avoidance of decreasing of the third party solicitation fee based, at least in part, on the determination that the user apparatus failed to perform the specified action.

One or more example embodiments further perform retention of value of the third party solicitation fee based, at least in part, on the determination that the user apparatus failed to perform the specified action.

One or more example embodiments further perform increasing of the third party solicitation fee based, at least in part, on the determination that the user apparatus failed to perform the specified action.

In at least one example embodiment, the decrease of the third party solicitation fee has a larger magnitude than a magnitude of the increase of the third party solicitation fee.

One or more example embodiments further perform determination of a specified action performance rate associated with the third party based, at least in part, on the determination that the user apparatus failed to perform the specified action and historical specified action performance information, and determination of an increase magnitude based, at least in part, on the specified action performance rate, wherein the increasing of the third party solicitation fee comprises increasing of the third party solicitation fee by the increase magnitude.

One or more example embodiments further perform determination that the specified action performance rate has decreased, wherein the determination of the increase magnitude is based, at least in part, on the determination that the specified action performance rate has decreased.

One or more example embodiments further perform determination that the third party solicitation fee is equal to a maximum third party solicitation fee, and retention of value of the third party solicitation fee based, at least in part, on the determination that the third party solicitation fee is equal to the maximum third party solicitation fee.

One or more example embodiments further perform determination that increase of the third party solicitation fee would cause the third party solicitation fee to become greater than a maximum third party solicitation fee, and setting of the third party solicitation fee to be equal to the maximum third party solicitation fee based, at least in part, on the determination that increase of the third party solicitation fee would cause the third party solicitation fee to become greater than the maximum third party solicitation fee.

One or more example embodiments further perform receipt of, from the third party server, another third party solicitation on behalf of the third party, sending of the other third party solicitation to the user apparatus in response to the receipt of the other third party solicitation, the other third party solicitation comprising a request for another specified action, and receipt of information indicative of the user apparatus performing the other specified action.

One or more example embodiments further perform determination that the third party solicitation fee is equal to a minimum third party solicitation fee, and retention of value of the third party solicitation fee based, at least in part, on the determination that the third party solicitation fee is equal to the minimum third party solicitation fee.

One or more example embodiments further perform determination that decrease of the third party solicitation fee would cause the third party solicitation fee to become less than a minimum third party solicitation fee, and setting of the third party solicitation fee to be equal to the minimum third party solicitation fee based, at least in part, on the determination that decrease of the third party solicitation fee would cause the third party solicitation fee to become less than the minimum third party solicitation fee.

One or more example embodiments further perform determination of a specified action performance rate associated with the third party based, at least in part, on the information indicative of the user apparatus performing the specified action and historical specified action performance information, and determination of a decrease magnitude based, at least in part, on the specified action performance rate, wherein the decreasing of the third party solicitation fee comprises decreasing of the third party solicitation fee by the decrease magnitude.

One or more example embodiments further perform determination that the specified action performance rate has increased, wherein the determination of the decrease magnitude is based, at least in part, on the determination that the specified action performance rate has increased.

BRIEF DESCRIPTION OF THE DRAWINGS

For a more complete understanding of one or more example embodiments, reference is now made to the following descriptions taken in connection with the accompanying drawings in which:

FIGS. 7A-7C are diagrams illustrating association tables according to at least one example embodiment;

FIGS. 8A-8B are diagrams illustrating association tables according to at least one example embodiment;

DETAILED DESCRIPTION OF THE DRAWINGS

Figure 1:
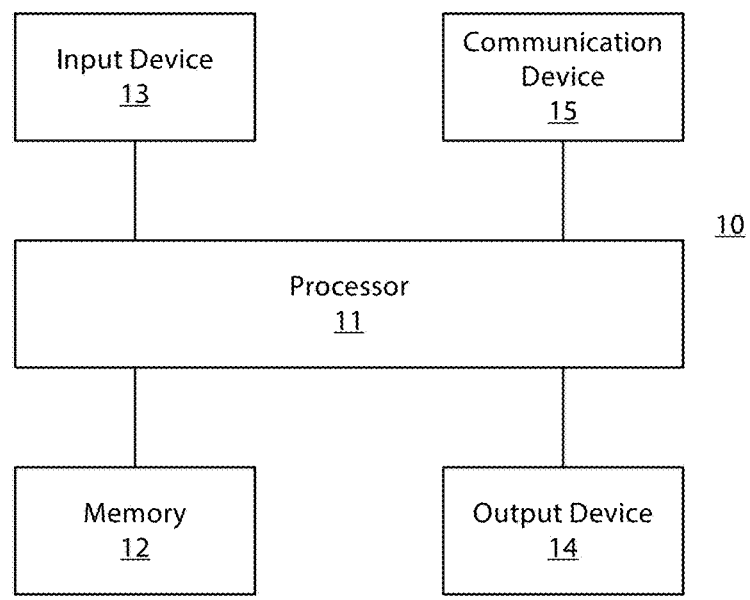
FIG. 1 is a block diagram showing an apparatus according to at least one example embodiment.

Various example embodiments and some of their potential advantages are understood by referring to FIGS. 1 through 13 of the drawings.

Some example embodiments will now further be described hereinafter with reference to the accompanying drawings, in which some, but not all, example embodiments are shown. One or more example embodiments may be embodied in many different forms and the claims should not be construed as being strictly limited to the example embodiments set forth herein; rather, these example embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with one or more example embodiments. Thus, use of any such terms should not be taken to limit the spirit and scope of example embodiments.

Additionally, as used herein, the term 'circuitry' refers to (a) hardware-only circuit implementations (e.g., implementations in analog circuitry, digital circuitry and/or any combination thereof); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that utilize software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit, an applications processor integrated circuit, a cellular network apparatus, other network apparatus, and/or other computing apparatus.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from one or more example embodiments and, therefore, should not be taken to limit the scope of the claims. While electronic apparatus 10 is illustrated and will be hereinafter described for purposes of example, other types of electronic apparatuses may readily employ one or more example embodiments. Electronic apparatus 10 may be a personal digital assistant (PDAs), a pager, a mobile computer, a desktop computer, a television, a gaming apparatus, a laptop computer, a tablet computer, a server, a service platform, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ one or more example embodiments regardless of any intent to provide mobility. In this regard, even though some example embodiments may be described in conjunction with mobile applications, it should be understood that such example embodiments may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises at least one processor, such as processor 11 and at least one memory, such as memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types (e.g., one or more standards in the Institute of Electrical and Electronics Engineers (IEEE) 802 family of wired and wireless standards). By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing one or more example embodiments including, for example, one or more of the functions described herein. For example, processor 11 may comprise means, such as a digital signal processor device, a microprocessor device, an analog to digital converter, a digital to analog converter, processing circuitry and other circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In example embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element that is separate from processor 11 for processing data, such as image data. The camera module may provide data, such as image data, in one or more of various formats. In at least one example embodiment, the camera module comprises an encoder, a decoder, and/or the like for compressing and/or decompressing image data. The encoder and/or decoder may encode and/or decode according to a standard format, for example, a Joint Photographic Experts Group (JPEG) standard format.

Figure 2A:
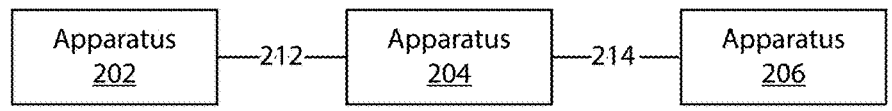
FIGS. 2A-2B are diagrams illustrating apparatus communication according to at least one example embodiment.
Figure 2B:
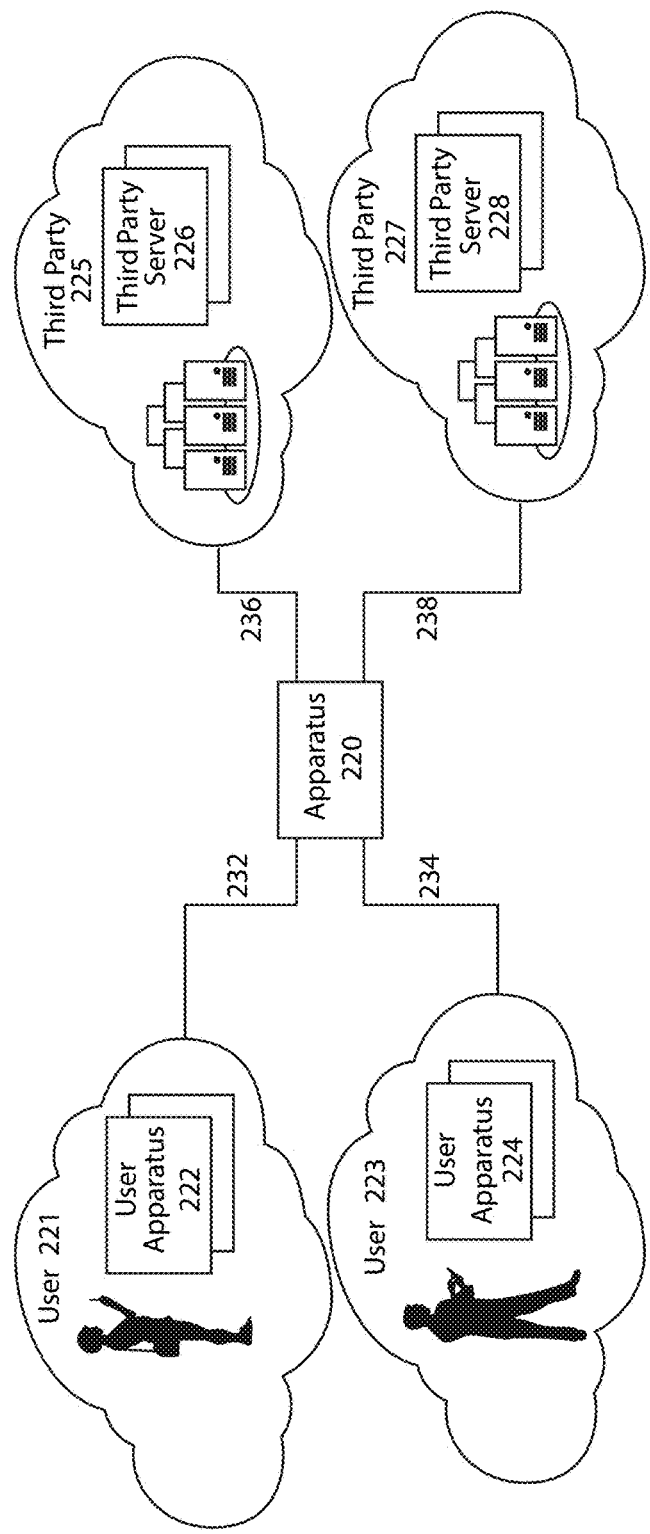

FIGS. 2A-2B are diagrams illustrating apparatus communication according to at least one example embodiment. The examples of FIGS. 2A-2B are merely examples and do not limit the scope of the claims. For example, apparatus count may vary, apparatus configuration may vary, communication channels may vary, third party and/or user count may vary, third party server configuration may vary, user apparatus count may vary, and/or the like.

FIG. 2A is a diagram illustrating apparatus communication according to at least one example embodiment. In the example of FIG. 2A, apparatus 202 is a user apparatus. A user apparatus may be an electronic apparatus that a user commonly utilizes during performance of various tasks, activities, and/or the like. For example, the user apparatus may be a near eye apparatus, a head mounted display, a phone, a tablet, a computer, a laptop, and/or the like. In the example of FIG. 2A, apparatus 204 is a separate apparatus. A separate electronic apparatus may be an electronic apparatus that a user often utilizes in conjunction with the user apparatus, as part of a service provided to the user by way of the user apparatus, to facilitate various interactions, and/or the like. For example, a separate apparatus may be a computer, a laptop, a server, a database server, a service platform, and/or the like. In the example of FIG. 2A, apparatus 206 is a third party server. A third party server may be an electronic apparatus that a user and/or another party commonly utilizes during performance of various tasks, activities, transactions, and/or the like. For example, the third party server may be a computer, a laptop, a server, a database server, a service platform, and/or the like. Although the aforementioned example describes apparatus 202, apparatus 204, and apparatus 206 as distinct types of apparatuses, namely, a user apparatus, a separate apparatus, and a third party server, in some circumstances, the apparatuses may each be an electronic apparatus, a separate apparatus, a user apparatus, a third party server, and/or the like.

In the example of FIG. 2A, apparatus 202 communicates with apparatus 204 by way of communication channel 212. For example, apparatus 202 may send information to apparatus 204 by way of communication channel 212, apparatus 202 may receive information sent from apparatus 204 by way of communication channel 212, and/or the like. A communication channel, for example, may be a channel utilized for sending and/or receiving of information, data, communications, and/or the like, between two or more apparatuses. It should be understood that, even though the example of FIG. 2A illustrates a direct communication channel between apparatus 202 and apparatus 204, there may be intermediate apparatuses that facilitate communication between apparatus 202 and apparatus 204. For example, there may be one or more routers, hubs, switches, gateways, and/or the like, that are utilized in the communication channels between apparatus 202 and apparatus 204. In addition, there may be other separate apparatuses that apparatus 202 and/or apparatus 204 are in communication with. For example, apparatus 202 and/or apparatus 204 may be in communication with another apparatus, a separate apparatus, a different apparatus, and/or the like.

In the example of FIG. 2B, apparatus 206 communicates with apparatus 204 by way of communication channel 214. For example, apparatus 206 may send information to apparatus 204 by way of communication channel 214, apparatus 206 may receive information sent from apparatus 204 by way of communication channel 214, and/or the like. It should be understood that, even though the example of FIG. 2B illustrates a direct communication channel between apparatus 206 and apparatus 204, there may be intermediate apparatuses that facilitate communication between apparatus 206 and apparatus 204. For example, there may be one or more routers, hubs, switches, gateways, and/or the like, that are utilized in the communication channels between apparatus 206 and apparatus 204. In addition, there may be other separate apparatuses that apparatus 206 and/or apparatus 204 are in communication with. For example, apparatus 206 and/or apparatus 204 may be in communication with another apparatus, a separate apparatus, a different apparatus, and/or the like. In this manner, apparatus 202 may be in communication with apparatus 206 by way of apparatus 204. For example, apparatus 206 may send information to apparatus 204, and apparatus 204 may subsequently send the information to apparatus 202.

In some circumstances, a user may desire to have collaboration between apparatuses, such as between an apparatus and a separate apparatus, based on their proximity with each other. For example, it may be intuitive for a user to manage collaboration between apparatuses that are local to each other. A plurality of apparatuses may be proximate to each other based, at least in part, on location, availability of local communication among the apparatuses, and/or the like. For example, if the apparatuses collaborate by way of low power radio frequency communication, a radio frequency communication, near field communication, inductive communication, electric field communication, Bluetooth communication, infrared communication, local area network communication, wireless local area network communication, local port communication, input/output port communication, and/or the like, the apparatuses may be considered to be proximate with each other based, at least in part, on availability of such proximity-based communication with each other. In at least one example embodiment, an apparatus may be a phone, a tablet, a computer, a display, a monitor, a head mounted display, a see through display, a wearable apparatus, a head worn apparatus, a hand worn apparatus, an electronic apparatus, a peripheral apparatus, a host apparatus, and/or the like. In at least one example embodiment, apparatuses communicate with each other. For example, an apparatus may be an apparatus that automatically communicates with another apparatus for purposes such as identifying the apparatus, synchronizing data, exchanging status information, and/or the like. In at least one example embodiment, an apparatus retains information associated with communication with a separate apparatus. For example, the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform. For example, the apparatus may be privileged to access specific information that may be stored on the separate apparatus, cause the apparatus to perform one or more operations in response to a directive communicated to the separate apparatus, and/or the like.

In at least one example embodiment, communication based, at least in part, on short range communication is referred to as proximity-based communication. In at least one example embodiment, proximity-based communication relates to wireless communication that is associated with a short range, such as low power radio frequency communication, radio frequency communication, near field communication, inductive communication, electric field communication, Bluetooth communication, infrared communication, local area network communication, wireless local area network communication, local port communication, input/output port communication, and/or the like. In such an example, the exchange of information may be by way of the short range wireless communication between the apparatus and a separate apparatus, host apparatus, and/or the like.

In at least one example embodiment, a proximity-based communication channel is a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. For example, as depicted in FIG. 2A, apparatus 202 communicates with apparatus 204 by way of a communication channel 212. In the example of FIG. 2A, communication channel 212 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. In another example, as depicted in FIG. 2A, apparatus 206 communicates with apparatus 204 by way of a communication channel 214. In the example of FIG. 2A, communication channel 214 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like.

In at least one example embodiment, an apparatus and a separate apparatus communicate by way of non-proximity-based communication channels. For example, as depicted in FIG. 2A, apparatus 202 communicates with apparatus 204 by way of communication channel 212. In the example of FIG. 2A, communication channel 212 may be a local area network communication channel, a wide area network communication channel, an internet communication channel, a cellular communication channel, and/or the like. Similarly, as depicted in FIG. 2A, apparatus 206 communicates with apparatus 204 by way of communication channel 214. In the example of FIG. 2A, communication channel 214 may be a local area network communication channel, a wide area network communication channel, an internet communication channel, a cellular communication channel, and/or the like.

In many circumstances, an apparatus may be in communication with a plurality of user apparatuses, a plurality of third party servers, and/or the like. For example, an apparatus may communicate information to and/or receive information from a particular user by way of the user apparatus that the particular user is utilizing, interacting with, and/or the like. In such an example, the apparatus may communicate information to and/or receive information from a different user by way of a different user apparatus that the different user is utilizing, interacting with, and/or the like. Similarly, an apparatus may communicate information to and/or receive information from a particular third party by way of one or more third party servers associated with the particular third party. In such an example, a third party server associated with the particular third party may be a server operated by the third party, a server operated for the third party, a server that is under the direction of the third party, a server that serves information associated with the third party, and/or the like. In such an example, the apparatus may communicate information to and/or receive information from a different third party by way of one or more third party servers associated with the different third party. In some circumstances, a third party and a different third party may utilize a common third party server. For example, the third party server may be associated with a service platform, a particular host, and/or the like. In such an example, the third party server may be associated with the third party and the different third party.

FIG. 2B is a diagram illustrating apparatus communication according to at least one example embodiment. The example of FIG. 2B depicts apparatus 220, which may be a computer, a laptop, a server, a database server, a service platform, and/or the like. In the example of FIG. 2B, apparatus 220 is in communication with user apparatus 222 of user 221 by way of communication channel 232, user apparatus 224 of user 223 by way of communication channel 234, third party server 226 of third party 225 by way of communication channel 236, and third party server 228 of third party 227 by way of communication channel 238. Each of communication channels 232, 234, 236, and 238 may be similar as described regarding the communication channels of FIG. 2A. As can be seen, user 221 may utilize one or more apparatuses in addition to user apparatus 222. As such, apparatus 220 may be in communication with one or more of the additional apparatuses of user 221. For example, user 221 may commonly interact with a phone, a tablet, a media player, and/or the like. In such an example, apparatus 220 may be in communication with the phone, the tablet, the media player, etc. by way of communication channel 232, another communication channel, and/or the like. Similarly, as can be seen, user 223 may utilize one or more apparatuses in addition to user apparatus 224. As such, apparatus 220 may be in communication with one or more of the additional apparatuses of user 223. For example, user 223 may commonly interact with a phone, a tablet, a media player, and/or the like. In such an example, apparatus 220 may be in communication with the phone, the tablet, the media player, etc. by way of communication channel 234, another communication channel, and/or the like.

In the example of FIG. 2B, third party 225 is associated with third party server 226. Third party server 226 may be a server, a service platform, a database server, and/or the like. As can be seen, third party 225 may utilize one or more third party servers in addition to third party server 226. As such, apparatus 220 may be in communication with one or more of the additional third party servers of third party 225 by way of communication channel 236, another communication channel, and/or the like. In the example of FIG. 2B, third party 227 is associated with third party server 228. Third party server 228 may be a server, a service platform, a database server, and/or the like. As can be seen, third party 227 may utilize one or more third party servers in addition to third party server 228. As such, apparatus 220 may be in communication with one or more of the additional third party servers of third party 227 by way of communication channel 238, another communication channel, and/or the like.

Figure 3A:
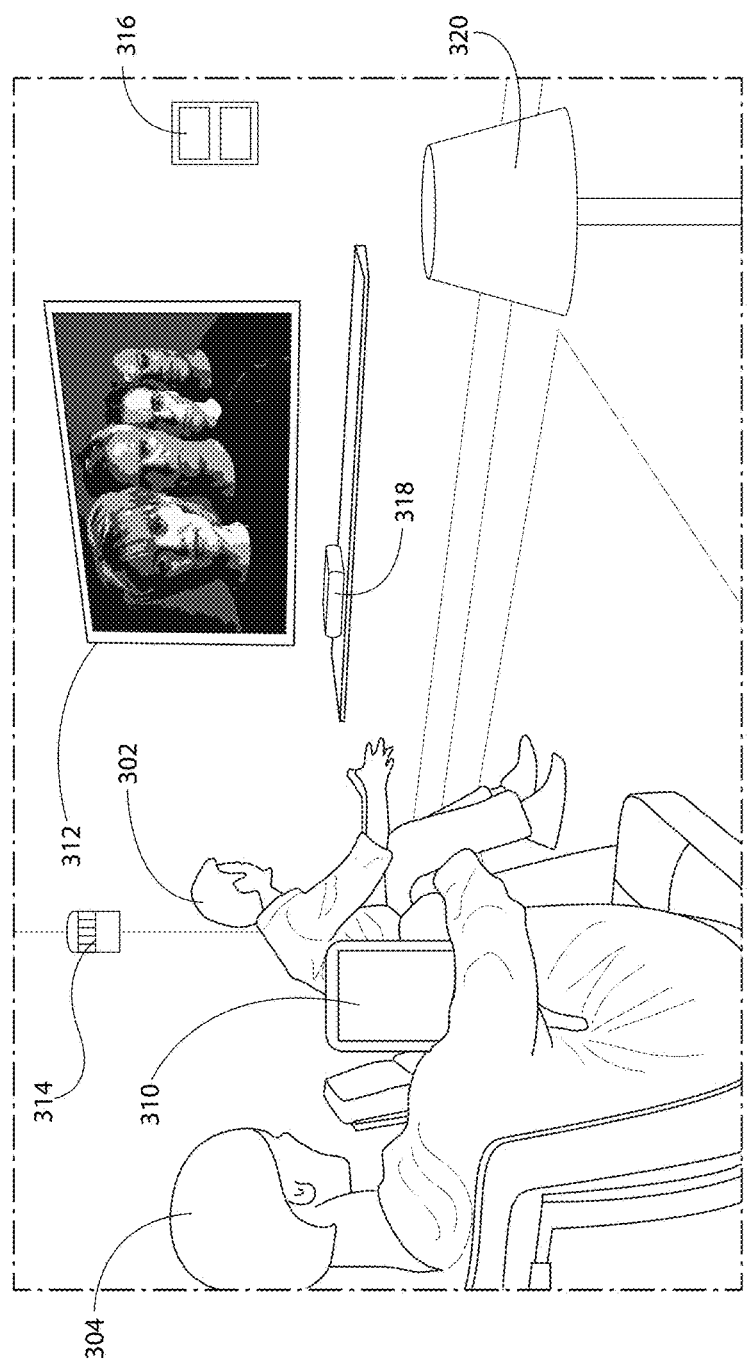
FIGS. 3A-3C are diagrams illustrating utilization of an apparatus according to at least one example embodiment.
Figure 3B:
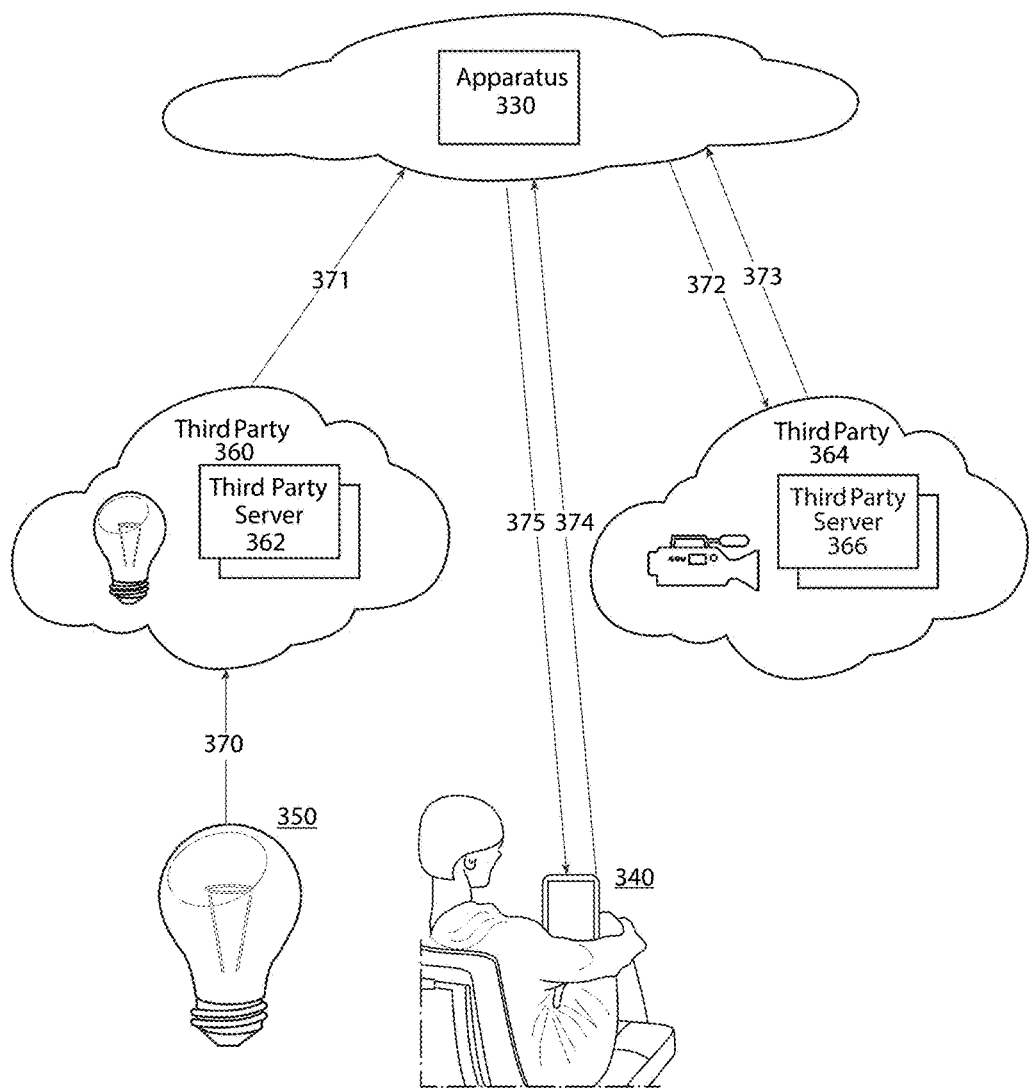
Figure 3C:
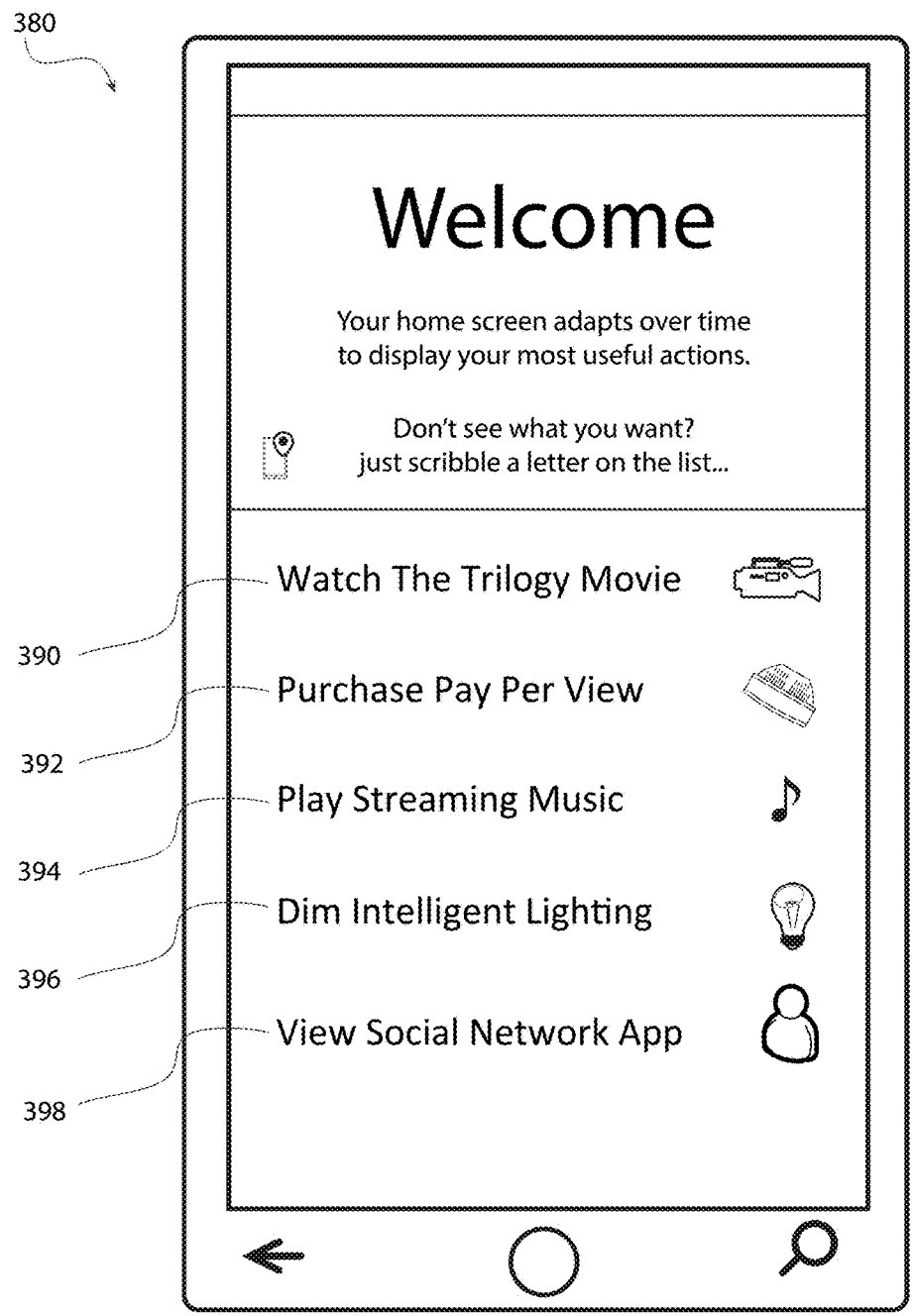

FIGS. 3A-3C are diagrams illustrating utilization of an apparatus according to at least one example embodiment. The examples of FIGS. 3A-3C are merely examples and do not limit the scope of the claims. For example, separate apparatuses may vary, communication channels may vary, third party propositions may vary, and/or the like.

In many circumstances, a user may utilize a user apparatus to facilitate performance of various tasks, to perceive information, to control one or more separate apparatus, and/or the like. For example, the user may commonly utilize a phone, a tablet, a media player, and/or the like to watch streaming video, to control and/or adjust a wireless-enabled thermostat, to dim one or more wireless-enabled lights, and/or the like. Further, in recent times, the Internet of Things has become an increasingly prevalent presence in the daily lives of many users. For example, many thermostats that are currently available on the market comprise motion sensors, occupancy sensors, and/or the like, and are configured to send notifications to a user when motion and/or occupancy is detected, to begin conditioning a space when motion and/or occupancy is detected, and/or the like. In another example, some light bulbs may be controlled wirelessly by way of a user apparatus. For example, a user of the user apparatus may dim the light bulbs, change the color of the light produced by the light bulbs, and/or the like by way of the user apparatus. There exists a wealth of information regarding a user, the environment surrounding the user, and/or the like. As such, it may be desirable to leverage such a wide assortment of contextual information in order to provide a better user experience to users of user apparatuses.

FIG. 3A is a diagram illustrating an environment of a user according to at least one example embodiment. The example of FIG. 3A depicts user 302 and user 304. As can be seen, user 304 is utilizing user apparatus 310. In the example of FIG. 3A, user apparatus 310 may be a phone, a tablet, a media player, and/or the like. As can be seen, user 302 and user 304 are sitting in a room that also contains a variety of separate apparatuses. For example, the room contains television 312, motion detector 314, thermostat 316, streaming apparatus 318, and light 320. A streaming apparatus may, for example, be a media streaming apparatus, a video streaming apparatus, a music streaming apparatus, a set-top box with streaming functionality, a television with streaming functionality, and/or the like. In the example of FIG. 3A, each of the separate apparatuses may be in communication with user apparatus 310, another separate apparatus, a server, a service platform, a third party server, and/or the like, by way of one or more communication channels.

In many circumstances, a user may commonly utilize several applications, services, and/or the like on their user apparatus. As such, many users may find it difficult to identify and utilize a particular application and/or service when the user may desire to do so, when the user may benefit from utilizing the particular application and/or service, and/ or the like. For example, a user interface of the user apparatus may be overly cluttered with applications, the user may forget that a particular application and/or service is available for utilization, and/or the like. As such, it may be desirable to configure an apparatus such that the apparatus may suggest a particular application and/or service by way of the user apparatus. For example, the suggested application and/or service may be a particular application and/or service that may be relevant to the user, applicable to a current situation being experienced by the user, and/or the like. For example, the suggested application and/or service may be based, at least in part, on a user context of the user. In such an example, the user context of the user may be associated with a location of the user, an activity of the user, a time of day, and/or the like. In such an example, it may be desirable to correlate usage of certain applications and/or services with a particular user context and, subsequently, promote the particular applications and/or services in a dynamic user interface in the future when the user's context is similar to the previous user context. As such, the user may be able to better take advantage of the applications and/or services that are accessible by way of the user apparatus at a time in the future when the user is likely to use or benefit from the application and/or service.

In order to facilitate such interactions, it may be desirable to determine a user context of a user. In at least one example embodiment, an apparatus determines a user context. In such an example, the user context may be a collection of information that indicates an activity of the user, a location of the user, an inferred desire of the user, a characterization of a situation being experienced by the user, and/or the like. The determination of the user context may be based, at least in part, on circumstantial information. In at least one example embodiment, the circumstantial information is information from which the user context may be inferred. For example, the circumstantial information may comprise sensor information, a time, a location, a weather condition, a temperature, a lighting level, an application interaction, an apparatus interaction with the user apparatus, an apparatus interaction with a separate apparatus, a user interaction with the user apparatus, a user interaction with a separate apparatus, and/or the like. In such an example, the separate apparatus may be any separate apparatus that may provide circumstantial information associated with the user. For example, the separate apparatus may be similar as described regarding separate apparatuses 312, 314, 316, 318, and 320 of FIG. 3A.

In order to facilitate such determination of a user context, it may be desirable to be in communication with one or more separate apparatuses which may identify various circumstantial information, record such circumstantial information, be aware of such circumstantial information, and/or the like. In at least one example embodiment, an apparatus receives circumstantial information that is indicative of a user context of a user. For example, the apparatus may receive the circumstantial information from a separate apparatus, from a plurality of separate apparatuses, and/or the like. In some circumstances, the circumstantial information received from a separate apparatus may be insufficient to determine a user context of the user. In such circumstances, it may be desirable to aggregate various circumstantial information from various separate apparatuses and to determine a user context of the user based, at least in part, on the aggregation of circumstantial information. In some circumstances, the user apparatus may be configured to provide circumstantial information associated with the user. In such circumstances, the separate apparatus may be the user apparatus. For example, the user utilizing the user apparatus may indicate that the user is awake and active, the user searching for a particular restaurant by way of an internet browser of the user apparatus may indicate that the user is seeking to eat and may require transportation, directions, and/or the like in the near future, and/or the like. In another example, the circumstantial information may indicate that the user is watching a movie at home, that the movie will end in 15 minutes, and that the user previously searched for a car service. In such an example, the aggregation of circumstantial information may be utilized in order to predict and/or promote applications, services, and/or the like which may be offered by various third parties.

In some circumstances, the user context may comprise information indicative of a user activity of the user. For example, the user context may comprise information that indicates that the user is walking to work, is eating with friends, is watching television, and/or the like. In some circumstances, the user context may comprise information indicative of a user apparatus operation of the user apparatus. For example, the user context may comprise information that indicates that the user has searched a particular search term by way of the user apparatus, that the user is utilizing a mapping application, a review application, etc. of the user apparatus, and/or the like. In another example, the user context may comprise information indicative of an application event associated with an application of the user apparatus. An application event may, for example, be an event associated with the application on a user apparatus, may indicate that the user has invoked a particular operation and/or functionality of the application on the user apparatus, and/or the like. For example, the user may utilize a calendar application of the user apparatus to facilitate management of the user's schedule. In such an example, the calendar application may be associated with one or more application events. For example, an application event may be actuated based, at least in part, on occurrence of a scheduled calendar event. In another example, the application event may be indicative of an application interaction of the user with the application. For example, the application event may indicate that the user is interacting with the associated application, that the user has caused evocation of one or more operations associated with the application, and/or the like.

In some circumstances, the user context may comprise information indicative of a separate apparatus operation of the separate apparatus. For example, the user context may comprise information that indicates that the user has adjusted the temperature by way of a thermostat, has dimmed the lighting by way of a light, has begun watching a movie by way of a streaming apparatus, and/or the like. In another example, the user context may comprise information indicative of an application event associated with an application of the separate apparatus. For example, the user may utilize a programmable thermostat to facilitate climate control within a particular space, such as the user's home. In such an example, the thermostat may be associated with one or more application events. For example, an application event may be actuated based, at least in part, on occurrence of a scheduled temperature adjustment, detection of motion within a particular space which may indicate that the user is home from work, and/or the like. In another example, the application event may be indicative of an application interaction of the user with the application. For example, the application event may indicate that the user is interacting with the associated application, that the user has caused evocation of one or more operations associated with the application, and/or the like.

In some circumstances, the user context may comprise information indicative of one or more environmental conditions. An environmental condition may be indicative of at least one environmental characteristic of an environment surrounding the user. For example, the environmental condition may comprise information indicative of a lighting level, a temperature, a time, a location, a weather condition, and/or the like.

As discussed previously, in many circumstances, it may be desirable to suggest a particular application and/or service to a user by way of a user apparatus. In order to provide the user with suggestions that are relevant to the user, as previously discussed, it may be desirable to infer a user's future desires, activities, etc. by way of historical information that indicates historical user actions, user activities, a sequence of interactions, and/or the like that may have been performed under a similar user context. In at least one example embodiment, determination of a user context is based, at least in part, on circumstantial information in relation to historical user context information. The historical user context information may, for example, comprise user context information associated with the user, user context information associated with at least another user, and/or the like. In this manner, the historical user context information may be indicative of previous actions of the user under a similar user context, previous actions of other users under a similar user context to the user, and/or the like. In this manner, the historical user context information may be utilized to infer past user context, present user context, future user context, and/or the like.

In some circumstances, the user context may be a past user context. In such circumstances, the past user context may be indicative of a user context of the user at a time prior to a time associated with a present user context. In this manner, the past user context may correlate with past user interactions, past user activities, past user actions, and/or the like, such that the past user context may be utilized in the determination of a present user context, a predicted user context, and/or the like. In some circumstances, the user context may be a present user context. In such circumstances, the present user context may be indicative of a user context of the user at a current time. The user context may be inferred to be a present user context based, at least in part, on a time of determination of the user context, on a time of receipt of the circumstantial information that indicated the user context, and/or the like. For example, once a user context has been determined, absence of receipt of circumstantial information that indicates a different user context may indicate that the user context is a present user context. In such an example, if additional circumstantial information that indicates a different user context is received by the apparatus, the user context, which was the present user context, may be a past user context, and the different user context may be the present user context.

In some circumstances, the user context may be a predicted user context. In such circumstances, the predicted user context may be indicative of a user context of the user at a time subsequent to a time associated with a present user context. In at least one example embodiment, the determination of the predicted user context is based, at least in part, on the circumstantial information in relation to historical user context information. For example, the predicted user context may be a subsequent user context of a user that is inferred from a past user context, a present user context, various circumstantial information, historical user context information, and/or the like. As such, it may be desirable to determine a probability that a particular predicted user context is applicable to a particular user. In at least one example embodiment, an apparatus determines that the circumstantial information in relation to the historical user context information indicates a probability that the predicted user context is applicable to the user. For example, the probability that the predicted user context is applicable to the user may exceed a threshold probability such that the predicted user context is determined to be applicable to the user. In another example, the probability that the predicted user context is applicable to the user may fail to exceed the threshold probability such that the predicted user context is determined to fail to be applicable to the user.

For example, a user may have, at some point in the past, walked into the user's living room at night, dimmed a light, turned on a television, and prompted a streaming device to begin streaming of a movie. In such an example, the circumstantial information is the time of day at night, the user's location at home, the user's location in the user's living room, the user's interaction with the light, the user's interaction with the television, the user's interaction with the streaming apparatus, and/or the like. In such an example, the user may, at some point in time subsequent to the initial interactions, begin performing a similar series of actions and interactions. For example, the user may again return home at night, walk into the user's living room, and turn on the television. In such an example, the past user context may be referenced in the determination of the present user context, the predicted user context, and/or the like. As such, based, at least in part, on the circumstantial information that indicates the user's location at home, the user's location in the user's living room, and the user's interaction with the television, the present user context may indicate that the user is preparing to watch something on the television. In such an example embodiment, the predicted user context may be determined based, at least in part, on the past user context that indicated that the user was watching a movie by way of the streaming apparatus in an environment with dimmed lighting. As such, it may be inferred that the user may desire to subsequently initiate playback of a movie by way of the streaming apparatus, to dim the light in order to create a more favorable viewing environment, and/or the like.

FIG. 3B is a diagram illustrating apparatus communication according to at least one example embodiment. In the example of FIG. 3B, a user is utilizing user apparatus 340, which is in communication with apparatus 330. Apparatus 330 may be a computer, a server, a service platform, a database server, and/or the like. In the example of FIG. 3B, the user may be sitting in the user's living room at home, similar as described regarding user 304 of FIG. 3A. The user may have walked into the living room, turned on a television, and dimmed light 350. In such a situation, based, at least in part, on the circumstantial information and the user context of the user, it may be inferred that the user desires to initiate playback of a streaming video.

In order to facilitate such a determination, it may be desirable to identify that a user is a particular user. In this manner, circumstantial information, user contexts, and/or the like may be associate with the user for future consideration, subsequent reference, and/or the like. In at least one example embodiment, an apparatus identifies a user account associated with a user. There are many manners in which a user may be identified, and there will likely be many additional manners developed in the future. As such, the particular manner in which the apparatus identifies the user does not limit the scope of the claims. For example, the user account may be associated with a user apparatus, and the identification of the user account associated with the user is based, at least in part, on the user apparatus. In another example, the apparatus may identify a particular user apparatus, and the identification of the user account associated with the user may be based, at least in part, on the identification of the user apparatus. In yet another example, the user account may be associated with a user identity, and the identification of the user account associated with the user may be based, at least in part, on the user identity. In such an example, the apparatus may identify the user identity, and the identification of the user account associated with the user may be based, at least in part, on the identification of the user identity.

Oftentimes, the user may have various additional user accounts associated with other applications, services, and/or the like. For example, the user may have a third party user account for a streaming server, another third party user account for a lighting control service, and/or the like. As such, in order to facilitate interoperability, sharing of circumstantial information and/or user contexts, and/or the like, it may be desirable to provide for aggregation of various third party user accounts, cooperative sharing of information that is associated with the user account and one or more third party user accounts, and/or the like. In at least one example embodiment, the user account references at least one third party user account that is associated with the user. In such an example embodiment, the third party user account may be associated with a third party. The third party may be any party, individual, service provider, and/or the like that is distinct from the user, the service provider of the user account, and/or the like.

In the example of FIG. 3B, light 350 is associated with third party 360. As previously discussed, the user depicted in the example of FIG. 3B may cause dimming of light 350 by way of interaction with light 350, by way of interaction with an application of user apparatus 340 that is associated with light 350, and/or the like. At interaction 370, the circumstantial information that indicates such an interaction is communicated to third party server 362 of third party 360. For example, light 350 may communicate such circumstantial information to third party server 362, user apparatus 340 may communicate such circumstantial information to third party server 362, and/or the like. At interaction 371, third party server 362 sends information indicative of the circumstantial information to apparatus 330. In this manner, apparatus 330 may aggregate circumstantial information received from various sources such that a user context of the user may be determined.

In many circumstances, it may be inferred that a user may desire to utilize a particular application, a specific service, and/or the like based, at least in part, on the user context of the user. In such circumstances, the application and/or service that the user may desire to utilize may be offered by a third party, supported by a third party, operated by a third party, and/or the like. In order to facilitate the suggestion of various third party applications and/or third party services to the user, it may be desirable to communicate information indicative of the user context to one or more third parties, one or more third party servers, and/or the like. In at least one example embodiment, an apparatus sends information indicative of a third party user account and a user context to a third party server. In such an example embodiment, the third party server may be associated with the third party user account. As discussed previously, the user account of the user may be associated with various third party user accounts. In this manner, the various third parties associated with the third party user accounts may identify the user, determine which circumstantial information is associated with which user, and/or the like.

User privacy has become an increasingly prevalent concern for users. For example, the user may desire to maintain privacy between various third party user accounts of the user. For example, the user may desire to avoid sharing a third party user account that is associated with a third party with a different third party. As such, in at least one example embodiment, an apparatus precludes sending, to a third party server, information indicative of at least one different third party user account that is associated with the user account. For example, the user's user account may be associated with a lighting-related third party user account and a media streaming-related third party user account. In such an example, the apparatus may preclude sending information indicative of the streaming third party user account to the lighting service provider that is associated with the lighting third party user account. Further, in at least one example embodiment, the apparatus precludes sending, to the third party server, information indicative of any different third party user account that is associated with the user account. In this manner, a third party may only receive information indicative of a third party user account that is associated with the third party.

Further, in some circumstances, the user may desire to have the user's user context communicated only to third parties and/or third party servers that are associated with relevant applications and/or services. In this manner, the user context may be shared with fewer third parties and, thus, kept relatively private. In at least one example embodiment, an apparatus determines that the user context is classified by at least one user context classification that is associated with the third party user account. For example, the user context classification may indicate a geographical market that is associated with the user context, a service industry which may be inferred from the user context, and/or the like. For example, the user context classification may indicate that the user context indicates a user desire to locate a restaurant, to view a movie, to receive navigation directions, to seek transportation to a particular venue, and/or the like. As such, third parties that offer applications and/or services that are related to the user context classification may be deemed to be particularly relevant to the user. In at least one example embodiment, the sending of the information indicative of the third party user account and the user context to a third party server is in response to the determination that the user context is classified by the user context classification that is associated with the third party user account.

As discussed previously, in many circumstances, it may be desirable to suggest one or more applications and/or services to a user based, at least in part, on the user context of the user, the user context classification of the user context, and/or the like. As described previously, in some circumstances, an apparatus may send information indicative of the user context and a third party user account to a third party server. In such circumstances, the third party, by way of the third party server, may analyze the user context and determine, infer, etc. that the third party offers applications, services, functionality, and/or the like that the user may be interested in, may desire to utilize, and/or the like. As such, the third party may desire to present a third party proposition to the user by way of the user apparatus of the user. Such a third party proposition may provide the user with information regarding one or more applications, functionalities, services, and/or the like that the third party may offer, support, provide, and/or the like. In at least one example embodiment, an apparatus receives a third party proposition from a third party server. In such an example embodiment, the receipt of the third party proposition may be in response to the sending of information indicative of the third party user account and the user context to the third party server of the third party. In this manner, the third party proposition may be associated with the user context, correlated with the user context, responsive to the user context, and/or the like.

In such circumstances, the third party proposition may comprise a third party advertisement, a third party solicitation, a third party notification, and/or the like. In at least one example embodiment, the third party proposition comprises a third party advertisement. The third party advertisement may comprise graphical information, textual information, and/or the like that advertises a particular application, service, functionality, and/or the like provided by the associated third party. Such a third party advertisement may be based, at least in part, on the user context of the user such that the third party advertisement is response to the user context. In at least one example embodiment, the third party proposition comprises a third party solicitation. In such an example embodiment, the third party solicitation may be a solicitation that is intended to solicit action from the user. For example, the third party solicitation may be a solicitation that is intended to solicit a user to cause invocation, by way of a user apparatus, of at least one operation. For example, the third party solicitation may solicit a user to cause invocation of a streaming operation associated with a streaming platform provided by the third party by way of the third party servers. In at least one example embodiment, the third party proposition comprises a third party notification. In such an example embodiment, the third party notification may notify the user as to occurrence of a particular event, may provide the user with information regarding the third party, may direct a user to interact with a particular separate apparatus, and/or the like.

In at least one example embodiment, an apparatus sends the third party proposition to a user apparatus. In such an example embodiment, the sending of the third party proposition may be in response to the receipt of the third party proposition from the third party server. In this manner, the user apparatus may receive the third party proposition and, subsequently, cause display of a representation of the third party proposition such that the user may perceive the third party proposition, act on the third party proposition, interact with the third party proposition, cause invocation of one or more operation associated with the third party proposition, and/or the like. In many circumstances, a user context may be communicated to a plurality of third party servers of various third parties. In such circumstances, the user may receive, by way of the user apparatus, a plurality of third party propositions from the various third party servers. In order to facilitate and enhance the predictive functionality of the user context, it may be desirable to quantify a level of correlation between a particular user context and a particular third party proposition such that a third party proposition that is deemed to be more relevant to the user context is emphasized over a third party proposition that is deemed to be less relevant to the user context. In at least one example, an apparatus receives information indicative of a quantitative correlation between the user context and the third party proposition. Such a quantitative correlation may be indicative of a probability that the user will desire to act on a particular third party proposition given the user context of the user. For example, a list of third party propositions may be displayed such that the list of third party propositions are arranged based, at least in part, on a probability that the user will desire to act on each third party proposition in the list of third party propositions.

In the example of FIG. 3B, at interaction 372, apparatus 330 sends information indicative of a user context of the user and information indicative of a third party user account associated with third party server 366 to third party server 366. In this manner, third party 364 may identify the particular user by way of the third party user account, and may analyze the user context of the user in order to facilitate identification of, generation of, determination of, etc. a third party proposition that may be relevant to the user based, at least in part, on the user context. At interaction 373, third party server 366 sends information indicative of a third party proposition to apparatus 330. In this manner, at interaction 373, apparatus 330 receives information indicative of the third party proposition from third party server 366. At interaction 375, apparatus 330 sends information indicative of the third party proposition to user apparatus 340 such that the user of the user apparatus may perceive the third party proposition, act on the third party proposition, cause invocation of one or more operations indicated by the third party proposition, and/or the like. For example, as depicted in the example of FIG. 3B and discussed previously, the user may have walked into the living room, turned on a television, and dimmed light 350. In such a situation, based, at least in part, on the circumstantial information and the user context of the user, it may be inferred that the user desires to initiate playback of a streaming video. As such, apparatus 330 may identify a third party user account associated with third party 364 that provides a streaming service and, at interaction 372, send information indicative of the third party user account and the user context to third party server 366 of third party 364. Subsequently, at interaction 373, apparatus 330 may receive a third party proposition that solicits a user to cause invocation of a particular streaming operation associated with the streaming service provided by third party 364. At interaction 375, apparatus 330 forwards the third party proposition to the user apparatus of the user.

In this manner, apparatus 330 may act as a user context exchange for various third parties. For example, third party 360 may publish circumstantial information associated with the user to the user context exchange by way of an issuing service of apparatus 330, a publishing service of the user context exchange, and/or the like. In such an example, third party 364 may subscribe to information that is published via the user content exchange by way of a subscribing service of the user context exchange. In this manner, various third parties may publish circumstantial information, subscribe to receive user context information, and/or the like such that, in aggregation, the various third parties are enabled to create and deliver targeted and relevant third party propositions to users by way of the user context exchange.

In some circumstances, an apparatus may determine that a user context classification fails to be associated with a third party user account, with an application and/or service provided by a third party associated with the third party user account, and/or the like. For example, a user account may reference a third party user account that is associated with the user, and determine that a user context classification of the user context fails to be associated with the third party user account. In such an example, the failure of the user context classification to be associated with the third party user account may indicate that the applications, services, functionality, etc. provided by the third party associated with the third party user account fails to be relevant to the user. As such, it may be desirable to preclude sending of information indicative of the user context to the particular third party by way of the third party server. In at least one example embodiment, an apparatus precludes sending information indicative of the third party user account and the user context to the third party server that is associated with the third party user account. Such a preclusion of sending of information indicative of the third party user account and the user context to the third party server may be in response to the determination that the at least one user context classification fails to be associated with the other third party user account.

In some circumstances, an apparatus may fail to receive any third party proposition from a third party server in response to the sending of information indicative of the third party user account and a user context to the third party server. In at least one example embodiment, an apparatus determines that a third party server failed to send any third party proposition in response to the sending of information indicative of the third party user account and the different user context. In such an example embodiment, the apparatus may preclude sending, to the user apparatus, of any third party proposition from the third party server that correlates with the user context in response to the determination that the third party server failed to send any third party proposition. For example, the apparatus may receive an indication that the third party does not have a third party proposition to send to the user apparatus, may determine that a timeout associated with receipt of a third party proposition from the third party server has elapsed, and/or the like.

FIG. 3C is a diagram illustrating a user apparatus according to at least one example embodiment. The example of FIG. 3C depicts user apparatus 380. As can be seen, user apparatus 380 is caused to display a plurality of representations that represent third party propositions 390, 392, 394, 396, and 398. As discussed previously regarding the example of FIG. 3B, apparatus 330 may receive a third party proposition that solicits a user to cause invocation of a particular streaming operation associated with the streaming service provided by third party 364 and, at interaction 375, forward the third party proposition to user apparatus 340 of the user. User apparatus 380 of FIG. 3C may correspond with user apparatus 340 of FIG. 3B. In this manner, third party proposition 390 may be a representation of the third party proposition that is communicated to user apparatus 340 in the example of FIG. 3B. In this manner, third party proposition 390 may solicit the user of apparatus 380 to cause invocation of a streaming operation associated with the streaming service provided by the third party. As can be seen, third party proposition 390 solicits the user to "Watch The Trilogy Movie." Such a third party proposition may be based, at least in part, on the user walking into the user's living room, the user turning on a television, the user dimming light 350, a user context that indicates that the user may desire to watch something on the television, a predicted user context that indicates that the user may desire to resume watching a particular trilogy series, and/or the like. The example of FIG. 3C also depicts representations of other third party propositions which may have been determined, by each respective third party, to be relevant to the user based, at least in part, on the user context of the user. For example, given the user context, the user may desire to watch different television programming, such as a pay per view sporting event, to play streaming music by way of a streaming apparatus, to further dim the lights to the level of illumination previously set, to browse a social network while relaxing on a chair in the living room, and/or the like.

Figure 4:
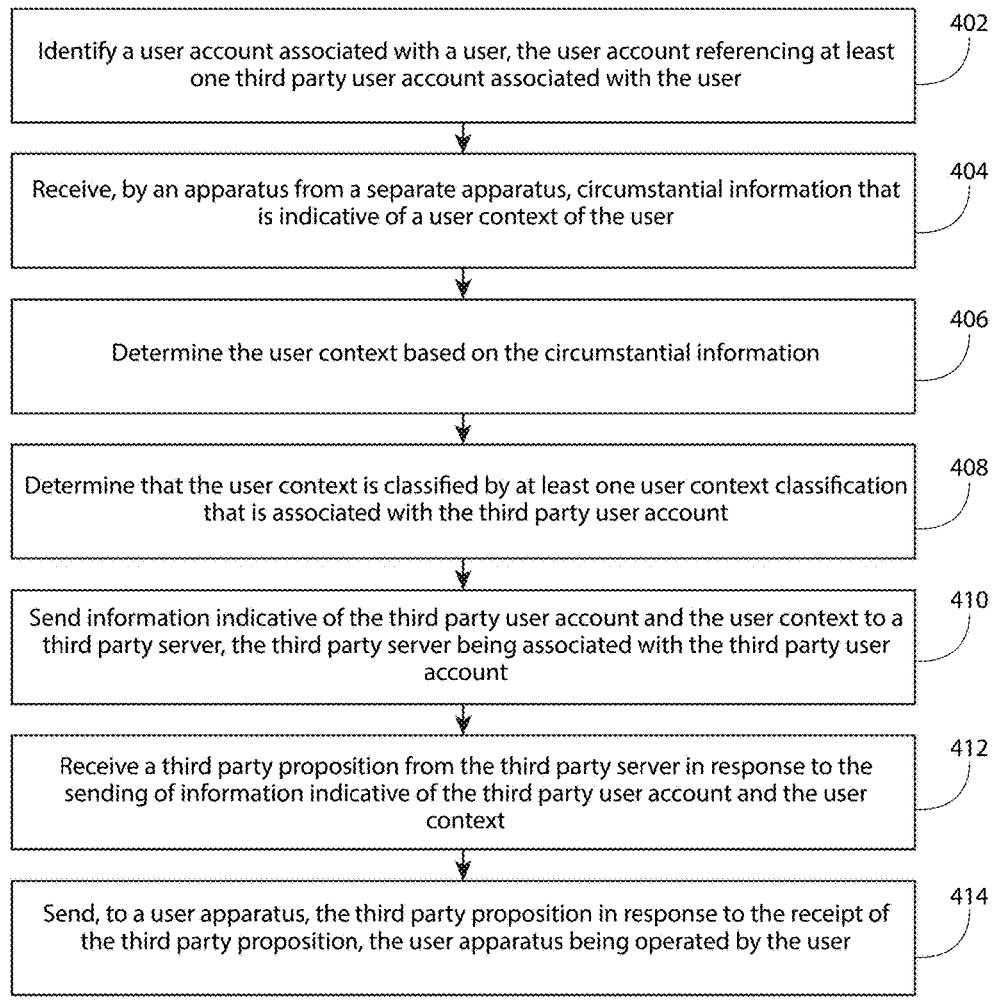
FIG. 4 is a flow diagram illustrating activities associated with sending of a third party proposition to a user apparatus according to at least one example embodiment.

FIG. 4 is a flow diagram illustrating activities associated with sending of a third party proposition to a user apparatus according to at least one example embodiment. In at least one example embodiment, there is a set of operations that corresponds with the activities of FIG. 4. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 4.

At block 402, the apparatus identifies a user account associated with a user. In at least one example embodiment, the user account references at least one third party user account associated with the user. The identification, the user account, the user, and the third party user account may be similar as described regarding FIGS. 2A-2B and FIGS. 3A-3C.

At block 404, the apparatus receives circumstantial information that is indicative of a user context of the user. In at least one example embodiment, the circumstantial information is received by an apparatus. In at least one example embodiment, the circumstantial information is received from a separate apparatus. The receipt, the circumstantial information, and the user context may be similar as described regarding FIGS. 2A-2B and FIGS. 3A-3C.

At block 406, the apparatus determines the user context based, at least in part, on the circumstantial information. The determination may be similar as described regarding FIGS. 2A-2B and FIGS. 3A-3C.

At block 408, the apparatus determines that the user context is classified by at least one user context classification that is associated with the third party user account. The determination and the user context classification may be similar as described regarding FIGS. 2A-2B and FIGS. 3A-3C.

At block 410, the apparatus sends information indicative of the third party user account and the user context to a third party server. In at least one example embodiment, the third party server is associated with the third party user account. In at least one example embodiment, the sending of information indicative of the third party user account and the user context to the third party server is performed in response to the determination that the user context is classified by the user context classification that is associated with the third party user account. The sending and the third party server may be similar as described regarding FIGS. 2A-2B and FIGS. 3A-3C.

At block 412, the apparatus receives a third party proposition from the third party server in response to the sending of information indicative of the third party user account and the user context. The receipt and the third party proposition may be similar as described regarding FIGS. 2A-2B and FIGS. 3A-3C.

At block 414, the apparatus sends the third party proposition in response to the receipt of the third party proposition. In at least one example embodiment, the apparatus sends the third party proposition to a user apparatus that is being operated by the user. The sending and the user apparatus may be similar as described regarding FIGS. 2A-2B and FIGS. 3A-3C.

Figure 5:
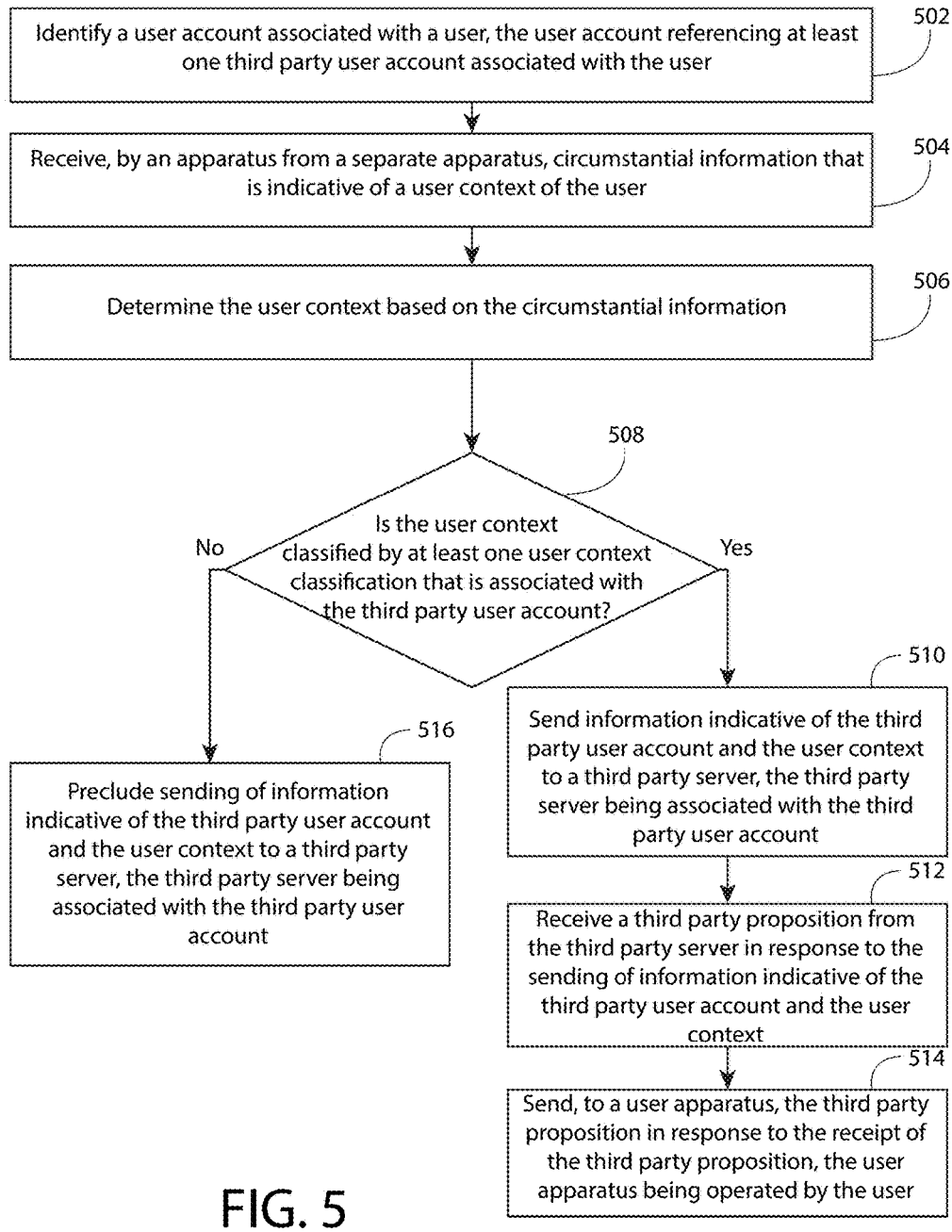
FIG. 5 is a flow diagram illustrating activities associated with sending of a third party proposition to a user apparatus according to at least one example embodiment.

FIG. 5 is a flow diagram illustrating activities associated with sending of a third party proposition to a user apparatus according to at least one example embodiment. In at least one example embodiment, there is a set of operations that corresponds with the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5.

At block 502, the apparatus identifies a user account associated with a user. In at least one example embodiment, the user account references at least one third party user account associated with the user. The identification, the user account, the user, and the third party user account may be similar as described regarding FIGS. 2A-2B and FIGS. 3A-3C.

At block 504, the apparatus receives circumstantial information that is indicative of a user context of the user. In at least one example embodiment, the circumstantial information is received by an apparatus. In at least one example embodiment, the circumstantial information is received from a separate apparatus. The receipt, the circumstantial information, and the user context may be similar as described regarding FIGS. 2A-2B and FIGS. 3A-3C.

At block 506, the apparatus determines the user context based, at least in part, on the circumstantial information. The determination may be similar as described regarding FIGS. 2A-2B and FIGS. 3A-3C.

At block 508, the apparatus determines whether the user context is classified by at least one user context classification that is associated with the third party user account. If the apparatus determines that the user context is classified by at least one user context classification that is associated with the third party user account, flow proceeds to block 510. If the apparatus determines that the user context fails to be classified by at least one user context classification that is associated with the third party user account, flow proceeds to block 516. The determination and the user context classification may be similar as described regarding FIGS. 2A-2B and FIGS. 3A-3C.

At block 510, the apparatus sends information indicative of the third party user account and the user context to a third party server. In at least one example embodiment, the third party server is associated with the third party user account. In at least one example embodiment, the sending of information indicative of the third party user account and the user context to the third party server is performed in response to the determination that the user context is classified by the user context classification that is associated with the third party user account. The sending and the third party server may be similar as described regarding FIGS. 2A-2B and FIGS. 3A-3C.

At block 512, the apparatus receives a third party proposition from the third party server in response to the sending of information indicative of the third party user account and the user context. The receipt and the third party proposition may be similar as described regarding FIGS. 2A-2B and FIGS. 3A-3C.

At block 514, the apparatus sends the third party proposition in response to the receipt of the third party proposition. In at least one example embodiment, the apparatus sends the third party proposition to a user apparatus that is being operated by the user. The sending and the user apparatus may be similar as described regarding FIGS. 2A-2B and FIGS. 3A-3C.

At block 516, the apparatus precludes sending of information indicative of the third party user account and the user context to a third party server. In at least one example embodiment, the third party server is associated with the third party user account. In at least one example embodiment, the preclusion of sending of information indicative of the third party user account and the user context to the third party server is performed in response to the determination that the user context fails to be classified by the user context classification that is associated with the third party user account. The preclusion, the sending, and the third party server may be similar as described regarding FIGS. 2A-2B and FIGS. 3A-3C.

Figure 6:
FIG. 6 is a flow diagram illustrating activities associated with preclusion of sending of a third party proposition to a user apparatus according to at least one example embodiment.

FIG. 6 is a flow diagram illustrating activities associated with preclusion of sending of a third party proposition to a user apparatus according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus identifies a user account associated with a user. In at least one example embodiment, the user account references at least one third party user account associated with the user. The identification, the user account, the user, and the third party user account may be similar as described regarding FIGS. 2A-2B and FIGS. 3A-3C.

At block 604, the apparatus receives circumstantial information that is indicative of a user context of the user. In at least one example embodiment, the circumstantial information is received by an apparatus. In at least one example embodiment, the circumstantial information is received from a separate apparatus. The receipt, the circumstantial information, and the user context may be similar as described regarding FIGS. 2A-2B and FIGS. 3A-3C.

At block 606, the apparatus determines the user context based, at least in part, on the circumstantial information. The determination may be similar as described regarding FIGS. 2A-2B and FIGS. 3A-3C.

At block 608, the apparatus determines that the user context is classified by at least one user context classification that is associated with the third party user account. The determination and the user context classification may be similar as described regarding FIGS. 2A-2B and FIGS. 3A-3C.

At block 610, the apparatus sends information indicative of the third party user account and the user context to a third party server. In at least one example embodiment, the third party server is associated with the third party user account. In at least one example embodiment, the sending of information indicative of the third party user account and the user context to the third party server is performed in response to the determination that the user context is classified by the user context classification that is associated with the third party user account. The sending and the third party server may be similar as described regarding FIGS. 2A-2B and FIGS. 3A-3C.

At block 612, the apparatus receives a third party proposition from the third party server in response to the sending of information indicative of the third party user account and the user context. The receipt and the third party proposition may be similar as described regarding FIGS. 2A-2B and FIGS. 3A-3C.

At block 614, the apparatus sends the third party proposition in response to the receipt of the third party proposition. In at least one example embodiment, the apparatus sends the third party proposition to a user apparatus that is being operated by the user. The sending and the user apparatus may be similar as described regarding FIGS. 2A-2B and FIGS. 3A-3C.

At block 616, the apparatus determines a different user context based, at least in part, on the circumstantial information. The determination and the different user context may be similar as described regarding FIGS. 2A-2B and FIGS. 3A-3C.

At block 618, the apparatus determines that the different user context is classified by at least one user context classification that is associated with the third party user account. The determination and the user context classification may be similar as described regarding FIGS. 2A-2B and FIGS. 3A-3C.

At block 620, the apparatus sends information indicative of the third party user account and the different user context to the third party server. In at least one example embodiment, the sending of information indicative of the third party user account and the different user context to the third party server is performed in response to the determination that the different user context is classified by the user context classification that is associated with the third party user account. The sending may be similar as described regarding FIGS. 2A-2B and FIGS. 3A-3C.

At block 622, the apparatus determines that the third party server failed to send any third party proposition in response to the sending of information indicative of the third party user account and the different user context. The determination may be similar as described regarding FIGS. 2A-2B and FIGS. 3A-3C.

At block 624, the apparatus precludes sending of any third party proposition from the third party server that correlates with the different user context in response to the determination that the third party server failed to send any third party proposition. In at least one example embodiment, the apparatus precludes sending of any third party proposition from the third party server to the user apparatus. The preclusion of sending may be similar as described regarding FIGS. 2A-2B and FIGS. 3A-3C.

FIGS. 7A-7C are diagrams illustrating various association tables according to at least one example embodiment. The examples of FIGS. 7A-7C are merely examples and do not limit the scope of the claims. For example, association table configuration may vary, content may vary, circumstantial information count may vary, and/or the like.

As discussed previously, in many circumstances, various information is associated with various other information. For example, a user account may be associated with one or more third party user accounts, a third party user account may be associated with one or more user account classifications, and/or the like. In order to facilitate recordation and maintenance of such associations, it may be desirable to store information indicative of such associations in one or more association tables.

FIG. 7A is a diagram illustrating a user context circumstantial information association table according to at least one example embodiment. In at least one example embodiment, a user context circumstantial information association table is a table that comprises information that indicates associations between specific user contexts and specific circumstantial information. As can be seen in FIG. 7A, user context circumstantial information association table 715 comprises information indicative of associations between user context 700 and circumstantial information 701, 702, 703, and 704, and information indicative of associations between user context 710 and circumstantial information 711, 712, and 713. For example, an apparatus may determine that a particular set of circumstantial information indicates a particular context by way of user context circumstantial information association table 715. For example, the apparatus may receive information indicative of circumstantial information 701, 702, and 704 from various separate apparatuses. In such an example, the apparatus may determine that the circumstantial information indicates user context 700 notwithstanding the failure to receive information indicative of circumstantial information 703. As such, in at least one example embodiment, the apparatus may infer, predict, etc. that the user context is user context 700 based, at least in part, on a partial correlation between the received circumstantial information and the circumstantial information comprised by user context circumstantial information association table 715.

FIG. 7B is a diagram illustrating a user account third party user account association table according to at least one example embodiment. As discussed previously, in many circumstances, an apparatus may identify a user account that is associated with one or more third party user accounts. In at least one example embodiment, a user account third party user account association table is a table that comprises information that indicates associations between specific user accounts and specific third party user accounts. As can be seen in FIG. 7B, user account third party user account association table 725 comprises information indicative of associations between user account 720 and third party user accounts 721, 722, and 723, information indicative of associations between user account 730 and third party user accounts 731 and 732, and information indicative of associations between user account 740 and third party user accounts 741, 742, 743, and 744. In the example of FIG. 7B, each third party user account that is associated with, for example, user account 720 may be associated with a third party that has been authorized by the user to receive information indicative of the user context of the user. For example, for reasons associated with privacy, the user may desire to limit sharing of such user context information to third parties that the user has explicitly authorized to receive such information, caused establishment of the association with the user account, and/or the like.

FIG. 7C is a diagram illustrating an association table according to at least one example embodiment. As discussed previously, in many circumstances, an apparatus may determine whether a third party user account is associated with a specific user context classification. In at least one example embodiment, a third party user account user context classification association table is a table that comprises information that indicates associations between specific third party user accounts and specific user context classifications. As can be seen in FIG. 7C, third party user account user context classification association table 755 comprises information indicative of associations between third party user account 750 and user context classifications 751 and 775, information indicative of associations between third party user account 760 and user context classifications 761, 762, 763, and 764, and information indicative of associations between third party user account 770 and user context classification 771. For example, third party user account 770 may be a third party user account associated with third party server 366 of third party 364 in the example of FIG. 3B. As such, user context classification 771 may indicate an entertainment classification, may indicate that the user context is associated with viewing of video content by way of a television, and/or the like.

FIGS. 8A-8B are diagrams illustrating association tables according to at least one example embodiment. The examples of FIGS. 8A-8B are merely examples and do not limit the scope of the claims. For example, association table configuration may vary, content may vary, association table format may vary, and/or the like.

As discussed previously, in some circumstances, a third party proposition may be a third party solicitation. For example, the third party solicitation may be a solicitation that is intended to solicit action from the user, intended to solicit a user to cause invocation, by way of a user apparatus, of at least one operation, and/or the like. For example, as depicted in the example of FIG. 3C, third party proposition 390 may be a third party solicitation that solicits a user to cause invocation of a streaming operation associated with a streaming platform. In some circumstances, such as those depicted in the example of FIG. 3C, a plurality of third party solicitations may be communicated to a user apparatus such that a user of the user apparatus may perceive the third party solicitations. In such circumstances, it may be desirable to ensure that the third party solicitations sent to the user apparatus are actually relevant to the user, relevant to the user context of the user, and/or the like. As such, it may be desirable to configure an apparatus such that the apparatus may incentivize the placement of relevant third party solicitations over the placement of irrelevant third party solicitations.

In this manner, a third party may be charged for placement of third party solicitation, and the third party may be rewarded by way of discounting the cost associated with presenting the third party solicitation to the user when the user acts on the third party solicitation. Such an incentivizing fee structure is counter to current advertisement platforms which have a different purpose, generating maximum advertisement revenues, and charge more when the user clicks on a placed advertisement. As such, under the incentivizing fee structure, a third party is rewarded when the third party takes care in sending third party solicitations that are directed to a particular user. For example, the third party may be rewarded for sending a third party solicitation to the user at a meaningful time according to the user context of the user. In this manner, the third party is incentivized to analyze and understand a user context of a user in order to provide the most relevant and desired third party solicitations, at the most relevant and desired times, and under the most relevant and desired user circumstances. As such, the incentivizing fee structure may facilitate the creation of a better user experience that provides third party solicitations to the user that the user will be most likely to find relevant, actionable, and/or the like.

In at least one example embodiment, an apparatus calculates a third party solicitation fee for a third party. The third party solicitation fee may be a fee that is charged in exchange for sending a third party solicitation to a user, in exchange for causing display of a third party solicitation on a user apparatus, and/or the like. As discussed previously, in at least one example embodiment, an apparatus may receive, from a third party server, a third party solicitation. The third party solicitation may be sent on behalf of the third party. For example, the third party may send the third party solicitation, another third party associated with the third party may send the third party solicitation on behalf of the third party, and/or the like. For example, the third party may employ an advertising agency, a solicitation network, and/or the like. In at least one example embodiment, the apparatus sends the third party solicitation to a user apparatus in response to the receipt of the third party solicitation. As discussed previously, the third party solicitation may comprise a request for a specified action. For example, the third party solicitation may specify the specified action, may comprise information that is configured to communicate the specified action to a user of the user apparatus, and/or the like. For example, the third party may be a transportation company, and the third party solicitation may solicit a user to call a taxi. In another example, the third party may be a streaming service, and the third party solicitation may solicit the user to sign into the streaming service and purchase a movie.

In order to facilitate the creation of a third party solicitation environment that is beneficial to users, it may be desirable to determine a third party solicitation fee for a particular third party based, at least in part, on user reactions to third party solicitations made by the third party. For example, if a user performs the specified action solicited by the third party solicitation, it may be inferred that the third party solicitation was particularly relevant to the user, to the user context of the user, and/or the like. In this matter, in order to provide a beneficial service to the user and other users with similar user context, it may be desirable to incentivize the third party to continue to generate relevant and desirable third party solicitations by way of decreasing the third party's third party solicitation fee. Alternatively, if a user fails to perform the specified action solicited by the third party solicitation, it may be inferred that the third party solicitation failed to be relevant to the user, to the user context of the user, and/or the like. In this matter, in order to provide a beneficial service to the user and other users with similar user context, it may be desirable to incentivize the third party to discontinue the generation of irrelevant and undesirable third party solicitations by way of increasing the third party's third party solicitation fee.

As such, in at least one example embodiment, an apparatus receives information indicative of the user apparatus performing the specified action. For example, the information indicative of the user apparatus performing the specified action may comprise information that indicates that a user of the user apparatus invoked the specified action. Such information may be received from the user apparatus, received from the third party server, and/or the like. In at least one example embodiment, the apparatus sends information indicative of the user apparatus performing the specified action to the third party server. For example, if the user in FIGS. 3B and 3C selects third party proposition 390, apparatus 330, third party 364, and/or the like may receive information indicative of the user apparatus performing the specified action.

In many circumstances, a plurality of third parties may desire to send third party solicitations to a user apparatus. As such, it may be desirable to configure the apparatus such that the apparatus may maintain a plurality of third party solicitation fees associated with a plurality of third parties. For example, the apparatus described previously may calculate another third party solicitation fee for another third party, and receive, from another third party server, another third party solicitation on behalf of the other third party. Subsequently, the apparatus may send the other third party solicitation that requests another specified action to the user apparatus in response to the receipt of the other third party solicitation. If the other third party solicitation was particularly relevant to the user, the user may perform the other specified action and, as a result, the apparatus may decrease the other third party solicitation fee based, at least in part, on the receipt of the information indicative of the user apparatus performing the other specified action.

In some circumstances, it may be desirable to maintain a minimum third party solicitation fee. For example, the minimum third party solicitation fee may be a fee that covers the cost of managing and sending such third party solicitations, a fee that provides for a baseline level of profit, a fee that incentivizes a third party to continue preparation and sending of third party solicitations, and/or the like. For example, an apparatus may determine that the third party solicitation fee is equal to a minimum third party solicitation fee, and may retain the value of the third party solicitation fee based, at least in part, on the determination that the third party solicitation fee is equal to the minimum third party solicitation fee. In such an example, the apparatus may preclude modification of the third party solicitation fee, may avoid decreasing of the third party solicitation fee beyond the minimum third party solicitation fee, and/or the like. In another example, the apparatus may determine that decrease of the third party solicitation fee would cause the third party solicitation fee to become less than a minimum third party solicitation fee. In such an example, the apparatus may set the third party solicitation fee to be equal to the minimum third party solicitation fee based, at least in part, on the determination that decrease of the third party solicitation fee would cause the third party solicitation fee to become less than the minimum third party solicitation fee. In at least one example embodiment, a third party solicitation fee is indirectly decreased by way of issuing a partial refund of the third party solicitation fee to the third party based, at least in part, on the receipt of the information indicative of the user apparatus performing the specified action.

In some circumstances, as discussed previously, a user may fail to perform the specified action of a third party solicitation. In such circumstances, the apparatus may determine that the user apparatus failed to perform the specified action. In response, the apparatus may avoid decreasing of the third party solicitation fee, retain the value of the third party solicitation fee, fail to modify the third party solicitation fee, and/or the like. However, in some circumstances, it may be desirable to implement a financial disincentive. In at least one example embodiment, an apparatus increases the third party solicitation fee based, at least in part, on the determination that the user apparatus failed to perform the specified action. In order to provide an equitable fee structure, it may be desirable to incentivize preparation of relevant third party solicitations over avoidance of preparation of irrelevant third party solicitations. Restated, it may be desirable for the magnitude of a reward for the third party to be greater than a magnitude of a penalty for the third party. As such, in at least one example embodiment, the decrease of the third party solicitation fee has a larger magnitude than a magnitude of the increase of the third party solicitation fee.

In some circumstances, it may be desirable to maintain a maximum third party solicitation fee. For example, a third party may desire to be informed as to the potential costs associated with sending of third party solicitations to user apparatuses. The institution of a maximum third party solicitation fee may provide the third party with an upper bound such that the third party may make an informed business decision as to whether or not to prepare and/or send third party solicitations. For example, an apparatus may determine that the third party solicitation fee is equal to a maximum third party solicitation fee, and may retain the value of the third party solicitation fee based, at least in part, on the determination that the third party solicitation fee is equal to the maximum third party solicitation fee. For example, the apparatus may preclude modification of the third party solicitation fee, may avoid increasing of the third party solicitation fee beyond the maximum third party solicitation fee, and/or the like. In another example, the apparatus may determine that increase of the third party solicitation fee would cause the third party solicitation fee to become greater than a maximum third party solicitation fee. In such an example, the apparatus may set the third party solicitation fee to be equal to the maximum third party solicitation fee based, at least in part, on the determination that increase of the third party solicitation fee would cause the third party solicitation fee to become greater than the maximum third party solicitation fee. In at least one example embodiment, a third party solicitation fee is indirectly increased by way of charging a penalty fee, in addition to the third party solicitation fee, to the third party based, at least in part, on the receipt of the information indicative of the user apparatus failing to perform the specified action, determination that the user apparatus failed to perform the specified action, and/or the like.

Although the prior discussion pertained to decreasing, increasing, and/or the like a third part solicitation fee, in some circumstances, it may be desirable to determine whether a user performed a specified action of a third party solicitation and charge a fee that is based, at least in part, on whether the user performed the specified action. For example, a third party may be charged a lower third party solicitation fee if it is determined that the user performed the specified action, and charged a higher third party solicitation fee if it is determined that the user failed to perform the specified action. In such an example, increasing of the third party solicitation fee may comprise setting the third party solicitation fee to the higher third party solicitation fee, and decreasing of the third party solicitation fee may comprise setting the third party solicitation fee to the lower third party solicitation fee. Similarly, increasing of the third party solicitation fee may comprise charging the third party with the higher third party solicitation fee, and decreasing of the third party solicitation fee may comprise charging the third party with lower third party solicitation fee. As such, a third party may be incentivized to provide pertinent and/or desirable third party solicitations by way of the lower third party solicitation fee, and incentivized to avoid providing expendable and/or undesirable third party solicitations by way of the higher third party solicitation fee.

In at least one example embodiment, an apparatus decreases the third party solicitation fee based, at least in part, on the receipt of the information indicative of the user apparatus performing the specified action. In such an example embodiment, the apparatus may send information indicative of the decreased third party solicitation fee to the third party server. The sending of information indicative of the decreased third party solicitation fee to the third party server may be performed in response to the calculation of the third party solicitation fee, in response to the decreasing of the third party solicitation fee, and/or the like. Similarly, in at least one example embodiment, an apparatus increases the third party solicitation fee based, at least in part, on the determination that the user apparatus failed to perform the specified action. In such an example embodiment, the apparatus may send information indicative of the increased third party solicitation fee to the third party server. The sending of information indicative of the increased third party solicitation fee to the third party server may be performed in response to the calculation of the third party solicitation fee, in response to the increasing of the third party solicitation fee, and/or the like.

In some circumstances, it may be desirable to provide a third party with information indicative of a third party solicitation fee in another manner. For example, the third party may prefer to view information associated with the third party solicitation fee through a web portal, by way of a hosted database service, via an Internet-accessible user interface, and/or the like. In such an example, the apparatus may cause storage of the information indicative of a third party solicitation fee. For example, the apparatus may store information indicative of the third party solicitation fee in memory, may send the information indicative of the third party solicitation fee to a separate apparatus, such as a server, a database appliance, etc., such that the separate apparatus is caused to store the information indicative of the third party solicitation fee, and/or the like. In such an example, the information indicative of the third party solicitation fee, such as information indicative of an increased third party solicitation fee, a decreased third party solicitation fee, a maximum third party solicitation fee, a minimum third party solicitation fee and/or the like, may be stored such that the third party may access the information, view the information, analyze the information, export the information, and/or the like.

FIG. 8A is a diagram illustrating a third party solicitation fee association table according to at least one example embodiment. In at least one example embodiment, a third party solicitation fee association table is a table that comprises information that indicates associations between specific third parties and specific third party solicitation fees. As can be seen in FIG. 8A, third party solicitation fee association table 800 comprises information indicative of associations between third party 810 and third party solicitation fee 811, between third party 820 and third party solicitation fee 821, and between third party 830 and third party solicitation fee 831. In the example of FIG. 8A, a particular third party solicitation fee, such as third party solicitation fee 811, may be increased, decreased, and/or the like.

In order to facilitate determination and charging of a third party solicitation fee that incentivizes creation of and sending of relevant third party solicitations, it may be desirable to base the third party solicitation fee on an aggregation of all third party solicitations associated with the third party. In this manner, the third party may be incentivized to ensure that every third party solicitation sent to a user apparatus, regardless of third party solicitation content, any specific third party solicitation campaign associations, etc. is relevant to the user, to the user context of the user, and/or the like. In at least one example embodiment, an apparatus determines a specified action performance rate associated with the third party based, at least in part, on the information indicative of the user apparatus performing the specified action and historical specified action performance information. For example, the apparatus may determine a decrease magnitude based, at least in part, on the specified action performance rate. In such an example, the decreasing of the third party solicitation fee may comprise decreasing of the third party solicitation fee by the decrease magnitude. For example, the apparatus may determine that the specified action performance rate has increased. In such an example, the determination of the decrease magnitude may be based, at least in part, on the determination that the specified action performance rate has increased. In this manner, an increase in the specified action performance rate may indicate that the third party solicitations being sent by the third party are viewed as relevant by the users and, thus, are acted upon.

In another example, an apparatus may determine a specified action performance rate associated with the third party based, at least in part, on the determination that the user apparatus failed to perform the specified action and historical specified action performance information. In such an example, the apparatus may determine an increase magnitude based, at least in part, on the specified action performance rate. In such an example, the increasing of the third party solicitation fee may comprise increasing of the third party solicitation fee by the increase magnitude. For example, the apparatus may determine that the specified action performance rate has decreased. In such an example, the determination of the increase magnitude may be based, at least in part, on the determination that the specified action performance rate has decreased. In this manner, a decrease in the specified action performance rate may indicate that the third party solicitations being sent by the third party are viewed as irrelevant by the users and, thus, fail to be acted upon.

FIG. 8B is a diagram illustrating a third party solicitation fee association table according to at least one example embodiment. In at least one example embodiment, a third party solicitation fee association table is a table that comprises information that indicates associations between specific third parties and specific third party solicitation fees, in addition to historical specified action performance information. As can be seen in FIG. 8B, third party solicitation fee association table 840 comprises information indicative of associations between third party 850, total solicitations 851, performed solicitations 852, and third party solicitation fee 853, between third party 860, total solicitations 861, performed solicitations 862, and third party solicitation fee 863, and between third party 870, total solicitations 871, performed solicitations 872, and third party solicitation fee 873. In the example of FIG. 8B, a particular third party solicitation fee, such as third party solicitation fee 853, may be increased, decreased, and/or the like. For example, a specified action performance rate may be calculated by way of dividing the number of performed solicitations by the number of total solicitations. Although the example of FIG. 8B depicts total solicitations and performed solicitations, the third party solicitation fee association table may store any values that may be utilized to determine the specified action performance rate. For example, the third party solicitation fee association table may store a number of performed solicitations and a number of ignored solicitations, a number of total solicitations and a number of unperformed solicitations, and/or the like.

Figure 9:
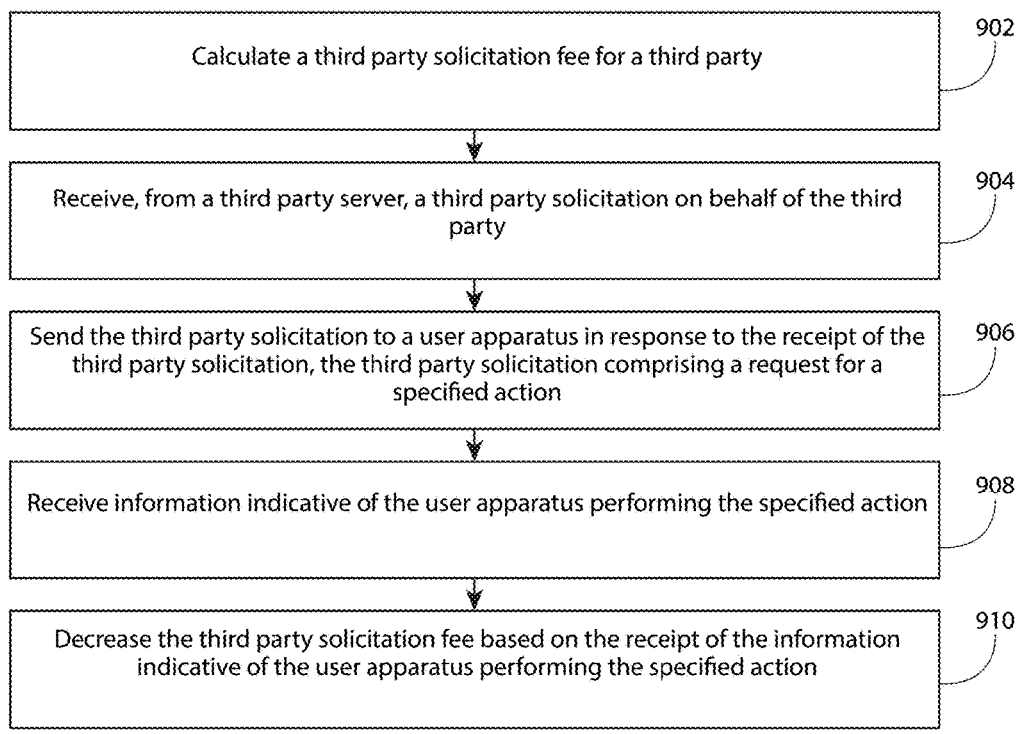
FIG. 9 is a flow diagram illustrating activities associated with decreasing of a third party solicitation fee according to at least one example embodiment.

FIG. 9 is a flow diagram illustrating activities associated with decreasing of a third party solicitation fee according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

At block 902, the apparatus calculates a third party solicitation fee for a third party. The calculation, the third party solicitation fee, and the third party may be similar as described regarding FIGS. 2A-2B, FIGS. 3A-3C, FIGS. 7A-7C, and FIGS. 8A-8B.

At block 904, the apparatus receives a third party solicitation on behalf of the third party. In at least one example embodiment, the apparatus receives the third party solicitations from a third party server. The receipt, the third party solicitation, and the third party server may be similar as described regarding FIGS. 2A-2B, FIGS. 3A-3C, FIGS. 7A-7C, and FIGS. 8A-8B.

At block 906, the apparatus sends the third party solicitation to a user apparatus in response to the receipt of the third party solicitation. In at least one example embodiment, the third party solicitation comprises a request for a specified action. The sending, the request for the specified action, and the user apparatus may be similar as described regarding FIGS. 2A-2B, FIGS. 3A-3C, FIGS. 7A-7C, and FIGS. 8A-8B.

At block 908, the apparatus receives information indicative of the user apparatus performing the specified action. The receipt may be similar as described regarding FIGS. 2A-2B, FIGS. 3A-3C, FIGS. 7A-7C, and FIGS. 8A-8B.

At block 910, the apparatus decreases the third party solicitation fee based, at least in part, on the receipt of the information indicative of the user apparatus performing the specified action. The decreasing of the third party solicitation fee may be similar as described regarding FIGS. 2A-2B, FIGS. 3A-3C, FIGS. 7A-7C, FIGS. 8A-8B, and FIG. 9.

Figure 10:
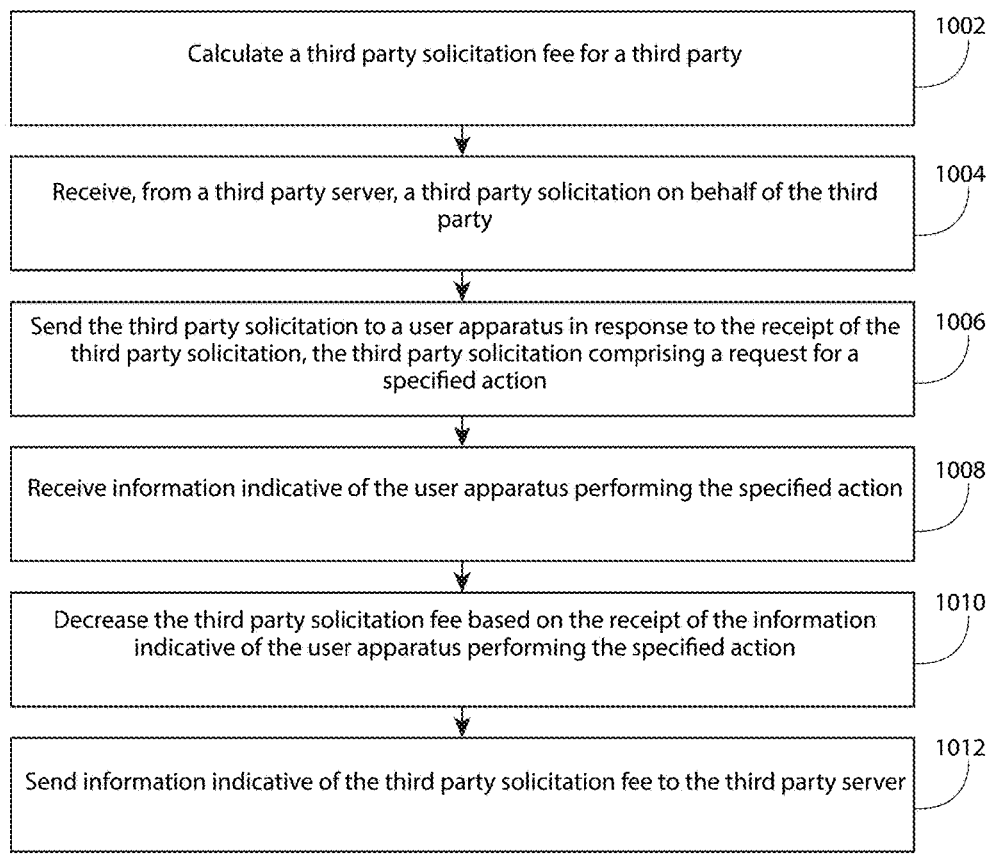
FIG. 10 is a flow diagram illustrating activities associated with decreasing of a third party solicitation fee according to at least one example embodiment.

FIG. 10 is a flow diagram illustrating activities associated with decreasing of a third party solicitation fee according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

At block 1002, the apparatus calculates a third party solicitation fee for a third party. The calculation, the third party solicitation fee, and the third party may be similar as described regarding FIGS. 2A-2B, FIGS. 3A-3C, FIGS. 7A-7C, and FIGS. 8A-8B.

At block 1004, the apparatus receives a third party solicitation on behalf of the third party. In at least one example embodiment, the apparatus receives the third party solicitations from a third party server. The receipt, the third party solicitation, and the third party server may be similar as described regarding FIGS. 2A-2B, FIGS. 3A-3C, FIGS. 7A-7C, and FIGS. 8A-8B.

At block 1006, the apparatus sends the third party solicitation to a user apparatus in response to the receipt of the third party solicitation. In at least one example embodiment, the third party solicitation comprises a request for a specified action. The sending, the request for the specified action, and the user apparatus may be similar as described regarding FIGS. 2A-2B, FIGS. 3A-3C, FIGS. 7A-7C, and FIGS. 8A-8B.

At block 1008, the apparatus receives information indicative of the user apparatus performing the specified action. The receipt may be similar as described regarding FIGS. 2A-2B, FIGS. 3A-3C, FIGS. 7A-7C, and FIGS. 8A-8B.

At block 1010, the apparatus decreases the third party solicitation fee based, at least in part, on the receipt of the information indicative of the user apparatus performing the specified action. The decreasing of the third party solicitation fee may be similar as described regarding FIGS. 2A-2B, FIGS. 3A-3C, FIGS. 7A-7C, FIGS. 8A-8B, and FIG. 9.

At block 1012, the apparatus sends information indicative of the third party solicitation fee to the third party server. In at least one example embodiment, the sending of the information indicative of the third party solicitation fee to the third party server is performed in response to the decreasing of the third party solicitation fee. The sending may be similar as described regarding FIGS. 2A-2B, FIGS. 3A-3C, FIGS. 7A-7C, FIGS. 8A-8B, and FIG. 9.

Figure 11:
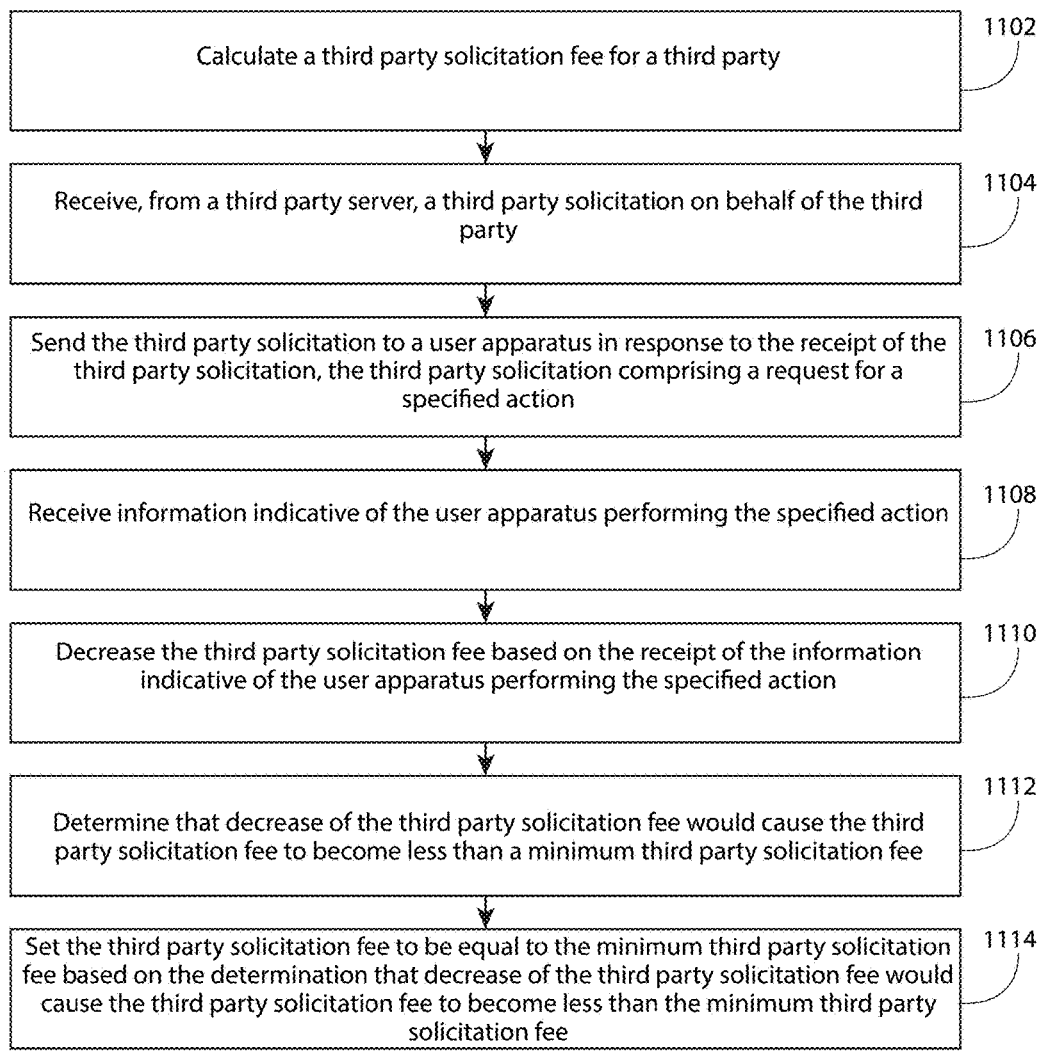
FIG. 11 is a flow diagram illustrating activities associated with decreasing of a third party solicitation fee according to at least one example embodiment.

FIG. 11 is a flow diagram illustrating activities associated with decreasing of a third party solicitation fee according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

At block 1102, the apparatus calculates a third party solicitation fee for a third party. The calculation, the third party solicitation fee, and the third party may be similar as described regarding FIGS. 2A-2B, FIGS. 3A-3C, FIGS. 7A-7C, and FIGS. 8A-8B.

At block 1104, the apparatus receives a third party solicitation on behalf of the third party. In at least one example embodiment, the apparatus receives the third party solicitations from a third party server. The receipt, the third party solicitation, and the third party server may be similar as described regarding FIGS. 2A-2B, FIGS. 3A-3C, FIGS. 7A-7C, and FIGS. 8A-8B.

At block 1106, the apparatus sends the third party solicitation to a user apparatus in response to the receipt of the third party solicitation. In at least one example embodiment, the third party solicitation comprises a request for a specified action. The sending, the request for the specified action, and the user apparatus may be similar as described regarding FIGS. 2A-2B, FIGS. 3A-3C, FIGS. 7A-7C, and FIGS. 8A-8B.

At block 1108, the apparatus receives information indicative of the user apparatus performing the specified action. The receipt may be similar as described regarding FIGS. 2A-2B, FIGS. 3A-3C, FIGS. 7A-7C, and FIGS. 8A-8B.

At block 1110, the apparatus decreases the third party solicitation fee based, at least in part, on the receipt of the information indicative of the user apparatus performing the specified action. The decreasing of the third party solicitation fee may be similar as described regarding FIGS. 2A-2B, FIGS. 3A-3C, FIGS. 7A-7C, FIGS. 8A-8B, and FIG. 9.

At block 1112, the apparatus determines that decrease of the third party solicitation fee would cause the third party solicitation fee to become less than a minimum third party solicitation fee. The determination and the minimum third party solicitation fee may be similar as described regarding FIGS. 8A-8B, FIG. 10, and FIG. 11.

At block 1114, the apparatus sets the third party solicitation fee to be equal to the minimum third party solicitation fee based, at least in part, on the determination that decrease of the third party solicitation fee would cause the third party solicitation fee to become less than a minimum third party solicitation fee. The setting of the third party solicitation fee may be similar as described regarding FIGS. 8A-8B, FIG. 10, and FIG. 11.

Figure 12:
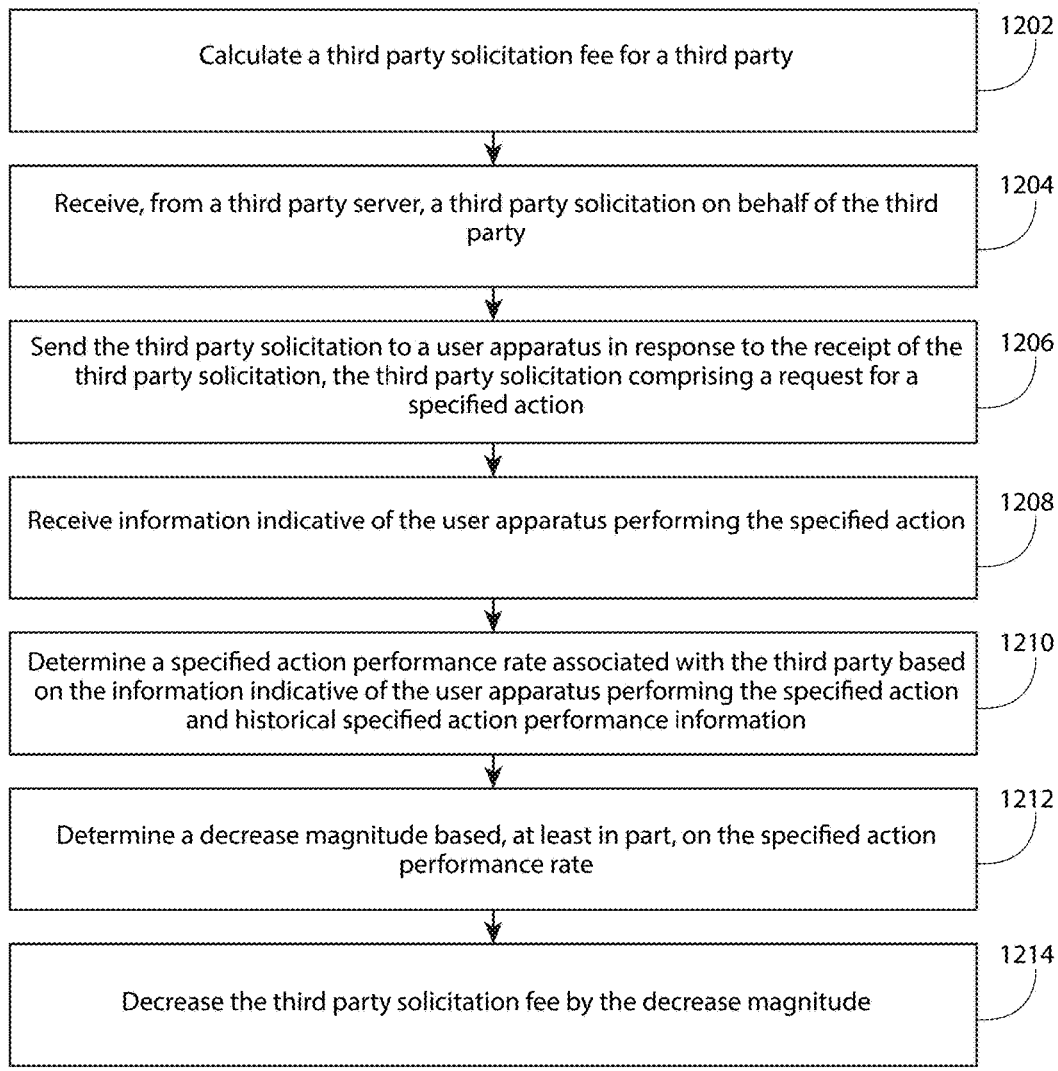
FIG. 12 is a flow diagram illustrating activities associated with decreasing of a third party solicitation fee according to at least one example embodiment.

FIG. 12 is a flow diagram illustrating activities associated with decreasing of a third party solicitation fee according to at least one example embodiment. In at least one example embodiment, there is a set of operations that corresponds with the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

At block 1202, the apparatus calculates a third party solicitation fee for a third party. The calculation, the third party solicitation fee, and the third party may be similar as described regarding FIGS. 2A-2B, FIGS. 3A-3C, FIGS. 7A-7C, and FIGS. 8A-8B.

At block 1204, the apparatus receives a third party solicitation on behalf of the third party. In at least one example embodiment, the apparatus receives the third party solicitations from a third party server. The receipt, the third party solicitation, and the third party server may be similar as described regarding FIGS. 2A-2B, FIGS. 3A-3C, FIGS. 7A-7C, and FIGS. 8A-8B.

At block 1206, the apparatus sends the third party solicitation to a user apparatus in response to the receipt of the third party solicitation. In at least one example embodiment, the third party solicitation comprises a request for a specified action. The sending, the request for the specified action, and the user apparatus may be similar as described regarding FIGS. 2A-2B, FIGS. 3A-3C, FIGS. 7A-7C, and FIGS. 8A-8B.

At block 1208, the apparatus receives information indicative of the user apparatus performing the specified action. The receipt may be similar as described regarding FIGS. 2A-2B, FIGS. 3A-3C, FIGS. 7A-7C, and FIGS. 8A-8B.

At block 1210, the apparatus determines a specified action performance rate associated with the third party based, at least in part, on the information indicative of the user apparatus performing the specified action and historical specified action performance information. The determination and the specified action performance rate may be similar as described regarding FIGS. 2A-2B, FIGS. 3A-3C, FIGS. 7A-7C, and FIGS. 8A-8B.

At block 1212, the apparatus determines a decrease magnitude based, at least in part, on the specified action performance rate. The determination and the decrease magnitude may be similar as described regarding FIGS. 2A-2B, FIGS. 3A-3C, FIGS. 7A-7C, and FIGS. 8A-8B.

At block 1214, the apparatus decreases the third party solicitation fee by the decrease magnitude. The decreasing of the third party solicitation fee may be similar as described regarding FIGS. 2A-2B, FIGS. 3A-3C, FIGS. 7A-7C, and FIGS. 8A-8B.

Figure 13:
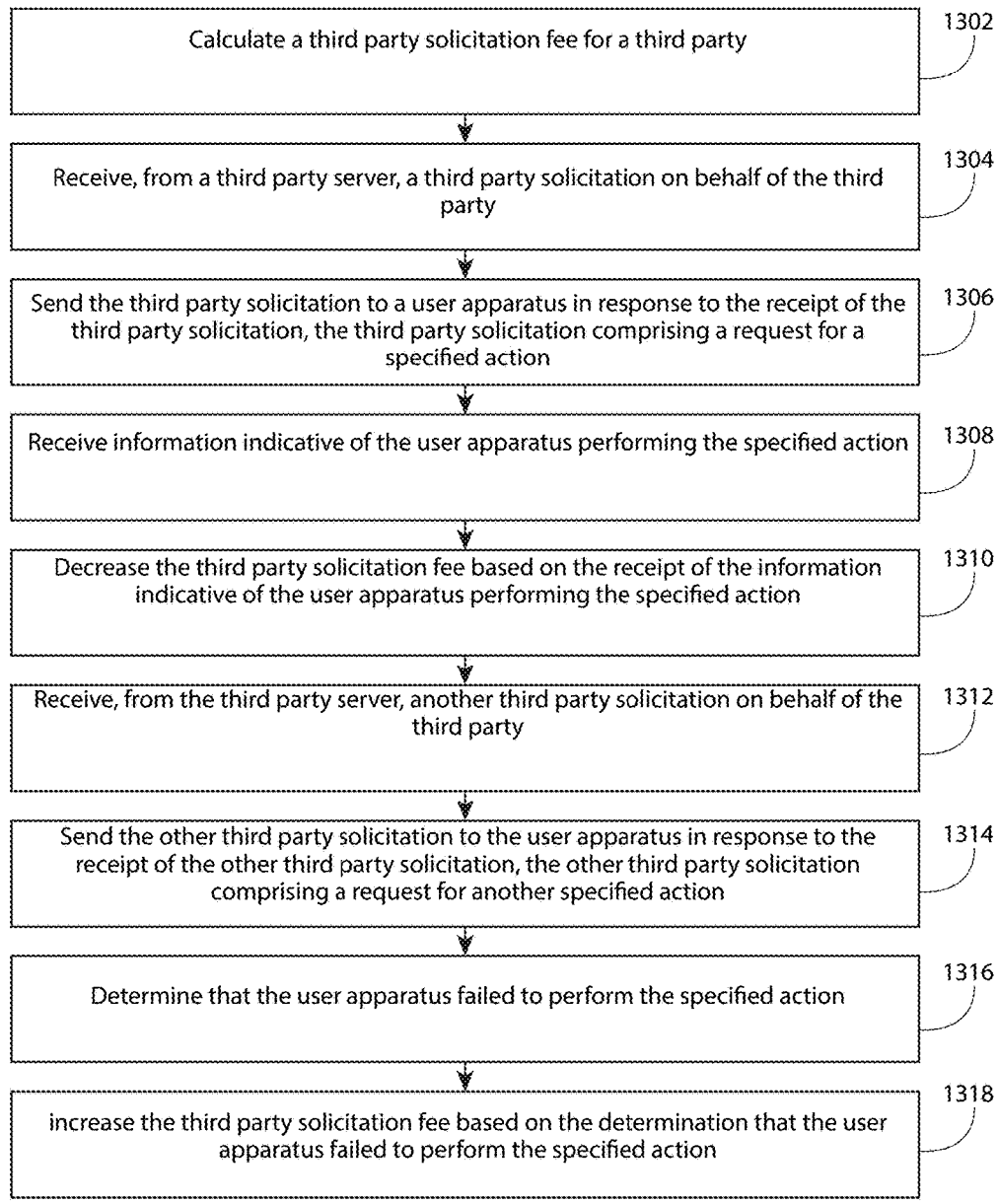
FIG. 13 is a flow diagram illustrating activities associated with increasing of a third party solicitation fee according to at least one example embodiment.

FIG. 13 is a flow diagram illustrating activities associated with increasing of a third party solicitation fee according to at least one example embodiment. In at least one example embodiment, there is a set of operations that corresponds with the activities of FIG. 13. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 13.

At block 1302, the apparatus calculates a third party solicitation fee for a third party. The calculation, the third party solicitation fee, and the third party may be similar as described regarding FIGS. 2A-2B, FIGS. 3A-3C, FIGS. 7A-7C, and FIGS. 8A-8B.

At block 1304, the apparatus receives a third party solicitation on behalf of the third party. In at least one example embodiment, the apparatus receives the third party solicitations from a third party server. The receipt, the third party solicitation, and the third party server may be similar as described regarding FIGS. 2A-2B, FIGS. 3A-3C, FIGS. 7A-7C, and FIGS. 8A-8B.

At block 1306, the apparatus sends the third party solicitation to a user apparatus in response to the receipt of the third party solicitation. In at least one example embodiment, the third party solicitation comprises a request for a specified action. The sending, the request for the specified action, and the user apparatus may be similar as described regarding FIGS. 2A-2B, FIGS. 3A-3C, FIGS. 7A-7C, and FIGS. 8A-8B.

At block 1308, the apparatus receives information indicative of the user apparatus performing the specified action. The receipt may be similar as described regarding FIGS. 2A-2B, FIGS. 3A-3C, FIGS. 7A-7C, and FIGS. 8A-8B.

At block 1310, the apparatus decreases the third party solicitation fee based, at least in part, on the receipt of the information indicative of the user apparatus performing the specified action. The decreasing of the third party solicitation fee may be similar as described regarding FIGS. 2A-2B, FIGS. 3A-3C, FIGS. 7A-7C, FIGS. 8A-8B, and FIG. 9.

At block 1312, the apparatus receives another third party solicitation on behalf of the third party. In at least one example embodiment, the apparatus receives the other third party solicitation from the third party server. The receipt and the other third party solicitation may be similar as described regarding FIGS. 2A-2B, FIGS. 3A-3C, FIGS. 7A-7C, and FIGS. 8A-8B.

At block 1314, the apparatus sends the other third party solicitation to the user apparatus. In at least one example embodiment, the other third party solicitation comprises a request for another specified action. In at least one example embodiment, the sending of the other third party solicitation to the user apparatus is performed in response to the receipt of the other third party solicitation. The sending and the other specified action may be similar as described regarding FIGS. 2A-2B, FIGS. 3A-3C, FIGS. 7A-7C, and FIGS. 8A-8B.

At block 1316, the apparatus determines that the user apparatus failed to perform the specified action. The determination may be similar as described regarding FIGS. 2A-2B, FIGS. 3A-3C, FIGS. 7A-7C, and FIGS. 8A-8B.

At block 1318, the apparatus increase the third party solicitation fee based, at least in part, on the determination that the user apparatus failed to perform the specified action. The increasing of the third party solicitation fee may be similar as described regarding FIGS. 2A-2B, FIGS. 3A-3C, FIGS. 7A-7C, and FIGS. 8A-8B.

One or more example embodiments may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various computer-readable media.

If desired, the different functions discussed herein may be performed in a different order and/or concurrently with each other. For example, block 402 of FIG. 4 may be performed after block 406 of FIG. 4. Furthermore, if desired, one or more of the above-described functions may be optional or may be combined. For example, block 902 of FIG. 9 may be optional and/or combined with block 910 of FIG. 9.

Although various aspects of the present subject matter are set out in the independent claims, other aspects of the present subject matter comprise other combinations of features from the described example embodiments and/or the dependent claims with the features of the independent claims, and not solely the combinations explicitly set out in the claims.

It is also noted herein that while the above describes example embodiments, these descriptions should not be viewed in a limiting sense. Rather, there are variations and modifications which may be made without departing from the scope of the present subject matter.

What is claimed is:

1. An apparatus, comprising:
   at least one processor;
   at least one memory including computer program code, the memory and the computer program code configured to, working with the processor, cause the apparatus to perform at least the following:
   receipt of a user context based on at least data detected from at least one of (a) a user apparatus, or (b) a sensor device or other apparatus in communication with the user apparatus;
   transmission of the user context to a third party;
   calculation of a third party solicitation fee for the third party for provision of a third party solicitation to the user apparatus;
   receipt of, from a third party server, the third party solicitation on behalf of the third party, wherein the third party solicitation is determined based on the user context;
   sending of the third party solicitation to the user apparatus in response to the receipt of the third party solicitation, the third party solicitation comprising a request for a specified action, wherein the user apparatus is configured to execute at least one application configured to provide the third party solicitation via a user interface of the user apparatus;
   determination, based on input received via the at least one application, that a user has performed the action specified in the third party solicitation;
   in response to the determination that the user has performed the action specified in the third party solicitation, decreasing of the third party solicitation fee; and
   transmission of an indication of the decreased third party solicitation fee to the third party server.

2. The apparatus of claim 1, wherein the memory includes computer program code configured to, working with the processor, cause the apparatus to perform sending of information indicative of the third party solicitation fee to the third party server.

3. The apparatus of claim 1, wherein the memory includes computer program code configured to, working with the processor, cause the apparatus to perform sending of information indicative of the user apparatus performing the specified action to the third party server.

4. The apparatus of claim 1, wherein the memory includes computer program code configured to, working with the processor, cause the apparatus to perform:
   receipt of, from the third party server, another third party solicitation on behalf of the third party;
   sending of the other third party solicitation to the user apparatus in response to the receipt of the other third party solicitation, the other third party solicitation comprising a request for another specified action; and
   determination that the user apparatus failed to perform the specified action.

5. The apparatus of claim 4, wherein the memory includes computer program code configured to, working with the processor, cause the apparatus to perform increasing of the third party solicitation fee based, at least in part, on the determination that the user apparatus failed to perform the specified action.

6. The apparatus of claim 5, wherein the decrease of the third party solicitation fee has a larger magnitude than a magnitude of the increase of the third party solicitation fee.

7. The apparatus of claim 5, wherein the memory includes computer program code configured to, working with the processor, cause the apparatus to perform:
   determination of a specified action performance rate associated with the third party based, at least in part, on the determination that the user apparatus failed to perform the specified action and historical specified action performance information; and
   determination of an increase magnitude based, at least in part, on the specified action performance rate, wherein the increasing of the third party solicitation fee comprises increasing of the third party solicitation fee by the increase magnitude.

8. The apparatus of claim 1, wherein the memory includes computer program code configured to, working with the processor, cause the apparatus to perform:
   determination of a specified action performance rate associated with the third party based, at least in part, on information indicative of the user apparatus performing the specified action and historical specified action performance information; and
   determination of a decrease magnitude based, at least in part, on the specified action performance rate, wherein the decreasing of the third party solicitation fee comprises decreasing of the third party solicitation fee by the decrease magnitude.

9. The apparatus of claim 1, wherein the memory includes computer program code configured to, working with the processor, cause the apparatus to perform:
   calculation of another third party solicitation fee for another third party;
   receipt of, from another third party server, another third party solicitation on behalf of the other third party; and
   sending of the other third party solicitation to the user apparatus in response to the receipt of the other third party solicitation, the other third party solicitation comprising a request for another specified action;
   receipt of information indicative of the user apparatus performing the other specified action; and
   decreasing of the other third party solicitation fee based, at least in part, on the receipt of the information indicative of the user apparatus performing the other specified action.

10. A method, comprising:
    receiving, by an apparatus, a user context based on at least data detected from at least one of (a) a user apparatus, or (b) a sensor device or other apparatus in communication with the user apparatus;
    transmitting the user context from the apparatus to a third party;
    calculating, by the apparatus, a third party solicitation fee for the third party for provision of a third party solicitation to the user apparatus;
    receiving, by the apparatus from a third party server, the third party solicitation on behalf of the third party, wherein the third party solicitation is determined based on the user context;
    sending the third party solicitation from the apparatus to the user apparatus in response to the receipt of the third party solicitation, the third party solicitation comprising a request for a specified action, wherein the user apparatus is configured to execute at least one application configured to provide the third party solicitation via a user interface of the user apparatus;

determining, by the apparatus, based on input received via the at least one application, that a user has performed the action specified in the third party solicitation;

in response to the determining that the user has performed the action specified in the third party solicitation, with the apparatus, decreasing the third party solicitation fee; and based transmitting an indication of the decreased third party solicitation fee from the apparatus to the third party server.

11. The method of claim 10, further comprising sending information indicative of the third party solicitation fee to the third party server.

12. The method of claim 10, further comprising:

receiving, from the third party server, another third party solicitation on behalf of the third party;

sending the other third party solicitation to the user apparatus in response to the receipt of the other third party solicitation, the other third party solicitation comprising a request for another specified action; and determining that the user apparatus failed to perform the specified action.

13. The method of claim 12, further comprising increasing the third party solicitation fee based, at least in part, on the determination that the user apparatus failed to perform the specified action.

14. The method of claim 13, wherein the decrease of the third party solicitation fee has a larger magnitude than a magnitude of the increase of the third party solicitation fee.

15. The method of claim 13, further comprising:

determining a specified action performance rate associated with the third party based, at least in part, on the determination that the user apparatus failed to perform the specified action and historical specified action performance information; and determining an increase magnitude based, at least in part, on the specified action performance rate, wherein the increasing of the third party solicitation fee comprises increasing of the third party solicitation fee by the increase magnitude.

16. The method of claim 10, further comprising:

determining a specified action performance rate associated with the third party based, at least in part, on information indicative of the user apparatus performing the specified action and historical specified action performance information; and determining a decrease magnitude based, at least in part, on the specified action performance rate, wherein the decreasing of the third party solicitation fee comprises decreasing of the third party solicitation fee by the decrease magnitude.

17. At least one non-transitory computer-readable medium encoded with instructions that, when executed by a processor, perform:

receipt of a user context based on at least data detected at least one of (a) from a user apparatus, or (b) a sensor device or other apparatus in communication with the user apparatus;

transmission of the user context to a third party;

calculation of a third party solicitation fee for the third party for provision of a third party solicitation to the user apparatus;

receipt of, from a third party server, the third party solicitation on behalf of the third party, wherein the third party solicitation is determined based on the user context;

sending of the third party solicitation to the user apparatus in response to the receipt of the third party solicitation, the third party solicitation comprising a request for a specified action, wherein the user apparatus is configured to execute at least one application configured to provide the third party solicitation via a user interface of the user apparatus;

determination, based on input received via the at least one application that a user has performed the action specified in the third party solicitation;

in response to the determination that the user has performed the action specified in the third party solicitation, decreasing of the third party solicitation fee; and transmission of an indication of the decreased third party solicitation fee to the third party server.

18. The medium of claim 17, further encoded with instructions that, when executed by a processor, perform:

receipt of, from the third party server, another third party solicitation on behalf of the third party;

sending of the other third party solicitation to the user apparatus in response to the receipt of the other third party solicitation, the other third party solicitation comprising a request for another specified action;

determination that the user apparatus failed to perform the specified action; and increasing of the third party solicitation fee based, at least in part, on the determination that the user apparatus failed to perform the specified action.

19. The medium of claim 18, further encoded with instructions that, when executed by a processor, perform:

determination of a specified action performance rate associated with the third party based, at least in part, on the determination that the user apparatus failed to perform the specified action and historical specified action performance information; and determination of an increase magnitude based, at least in part, on the specified action performance rate, wherein the increasing of the third party solicitation fee comprises increasing of the third party solicitation fee by the increase magnitude.

20. The medium of claim 17, further encoded with instructions that, when executed by a processor, perform:

determination of a specified action performance rate associated with the third party based, at least in part, on information indicative of the user apparatus performing the specified action and historical specified action performance information; and determination of a decrease magnitude based, at least in part, on the specified action performance rate, wherein the decreasing of the third party solicitation fee comprises decreasing of the third party solicitation fee by the decrease magnitude.

* * * * *